(12) United States Patent
Morris et al.

(10) Patent No.: US 11,545,826 B2
(45) Date of Patent: Jan. 3, 2023

(54) ELECTRICAL POWER DISTRIBUTION SYSTEMS WITH A BYPASS UNIT THAT COUPLES TO A LOAD AND ELECTRICALLY ENGAGES ONE OF TWO ALTERNATE UNITS FOR POWERING THE LOAD AND RELATED METHODS

(71) Applicant: Eaton Intelligent Power Limited, Dublin (IE)

(72) Inventors: Robert A. Morris, Sanford, NC (US); Morris Len Roush, Jr., Fayetteville, NC (US); Matthew R. Hussey, Fuquay-Varina, NC (US)

(73) Assignee: Eaton Intelligent Power Limited, Dublin (IE)

( * ) Notice: Subject to any disclaimer, the term of this patent is extended or adjusted under 35 U.S.C. 154(b) by 377 days.

(21) Appl. No.: 16/911,899

(22) Filed: Jun. 25, 2020

(65) Prior Publication Data

US 2020/0412123 A1    Dec. 31, 2020

Related U.S. Application Data

(60) Provisional application No. 62/867,995, filed on Jun. 28, 2019.

(51) Int. Cl.
*H02H 7/08*    (2006.01)
*H02H 3/02*    (2006.01)

(52) U.S. Cl.
CPC ........ *H02H 7/0844* (2013.01); *H02H 7/0822* (2013.01); *H02H 3/023* (2013.01)

(58) Field of Classification Search
CPC ..... H02H 7/0844; H02H 7/0822; H02H 3/023
See application file for complete search history.

(56) References Cited

U.S. PATENT DOCUMENTS

| | | | |
|---|---|---|---|
| 4,024,441 A | 5/1977 | Coyle et al. | |
| 4,503,408 A | 3/1985 | Mrenna et al. | |
| 5,910,760 A | 6/1999 | Malingowski et al. | |
| 7,525,809 B2 | 4/2009 | Bergmann et al. | |
| 8,934,218 B2 | 1/2015 | Morris | |
| 9,338,904 B2 | 5/2016 | Stoner et al. | |
| 9,350,199 B2 * | 5/2016 | Siciliano | H02J 9/06 |
| 9,460,881 B1 | 10/2016 | Morris | |
| 9,692,254 B2 | 6/2017 | Tomassi | |
| 9,696,704 B2 | 7/2017 | Xu et al. | |
| 9,843,171 B2 | 12/2017 | Richards et al. | |
| 9,941,645 B2 | 4/2018 | Morris | |

(Continued)

OTHER PUBLICATIONS

Allen-Bradley "PowerFlex 70 Adjustable Frequency AC Drive" User Manual (112 pages) (2001).

(Continued)

*Primary Examiner* — Scott Bauer
(74) *Attorney, Agent, or Firm* — Stanek Lemon Crouse & Meeks, PA

(57) ABSTRACT

Electrical power distribution systems with a bypass unit that electrically engages one of two alternate units for powering a load while electrically isolating the other using a power transfer switch with first and second contactors and mechanical and electrical interlocks to allow a technician to access one of the alternate units when de-energized and in position while the other of the alternate units is energized and powering the load.

35 Claims, 23 Drawing Sheets

(56) References Cited

U.S. PATENT DOCUMENTS

| | | | |
|---|---|---|---|
| 10,292,290 B2 | 5/2019 | Morris et al. | |
| 10,348,064 B2 | 7/2019 | Jung | |
| 10,856,453 B2 | 12/2020 | Easton et al. | |
| 10,923,888 B2 | 2/2021 | Benson et al. | |
| 2001/0020834 A1 | 9/2001 | Berkowitz et al. | |
| 2008/0022673 A1 | 1/2008 | Morris et al. | |
| 2008/0137266 A1 | 6/2008 | Jensen et al. | |
| 2009/0176417 A1* | 7/2009 | Rembach | B63J 3/02 440/6 |
| 2010/0140061 A1* | 6/2010 | Gibbs | H01H 9/26 200/50.32 |
| 2013/0077210 A1 | 3/2013 | Morris | |
| 2014/0126120 A1 | 5/2014 | Lehtola et al. | |
| 2014/0321067 A1* | 10/2014 | Leeman | H02B 1/36 361/728 |
| 2015/0115719 A1 | 4/2015 | Siciliano et al. | |
| 2015/0214779 A1 | 7/2015 | Tomassi | |
| 2016/0018878 A1* | 1/2016 | Dustman | G06F 1/3206 710/315 |
| 2017/0237287 A1 | 8/2017 | Dolinski et al. | |
| 2018/0048159 A1* | 2/2018 | Narla | H02S 40/30 |
| 2019/0190240 A1 | 6/2019 | Kroushl et al. | |
| 2019/0199086 A1* | 6/2019 | Li | H02H 7/1225 |
| 2019/0199125 A1 | 6/2019 | Oliver et al. | |

OTHER PUBLICATIONS

Eaton Corporation "Freedom FlashGard motor control center" Instruction Booklet IM04302001E (36 pages) (2016).

Eaton Corporation "Using an adjustable frequency drive with a soft starter bypass" Product Application AP03902004E (2 pages) (2009).

* cited by examiner

ELECTRICAL INTERLOCKING SYSTEM

| CONDITION/INTERLOCK | PRIMARY UNIT $50_1$ | SECONDARY UNIT $50_2$ | BYPASS UNIT 10 | BYPASS UNIT 10 |
|---|---|---|---|---|
| UNIT DISCONNECT (BREAKER) | AUXILIARY SWITCH AND/OR MOTOR STARTER RELAY SENDS TRIP SIGNAL TO SECONDARY UNIT BREAKER | BREAKER SHUNT TRIP COIL TRIPS BREAKER | IN PRIMARY MODE | IN BYPASS MODE |
| UNIT DISCONNECT (BREAKER) | BREAKER SHUNT TRIP COIL TRIPS BREAKER | AUXILIARY SWITCH AND/OR RELAY SENDS TRIP SIGNAL TO PRIMARY UNIT | | |
| BYPASS PRIMARY MODE | ENERGIZED | | AUXILIARY SWITCH SENDS TRIP SIGNAL TO SECONDARY UNIT BREAKER | |
| BYPASS MODE | BREAKER SHUNT TRIP COIL TRIPS BREAKER | ENERGIZED | | AUXILIARY SWITCH SENDS TRIP SIGNAL TO PRIMARY UNIT BREAKER |
| PRIMARY UNIT POWER DISCONNECT ASSEMBLY CONNECTED | POWER DISCONNECT ASSEMBLY ENERGIZED AUXILIARY SWITCH SENDS TRIP SIGNAL TO SECONDARY UNIT | BREAKER SHUNT TRIP COIL AND/OR MOTOR STARTER RELAY TRIPS BREAKER OF PRIMARY UNIT | PRIMARY UNIT POWER DISCONNECT ASSEMBLY CONNECTED | |
| SECONDARY UNIT POWER DISCONNECT ASSEMBLY CONNECTED | BREAKER SHUNT TRIP COIL TRIPS BREAKER | POWER DISCONNECT ASSEMBLY ENERGIZED AUXILIARY SWITCH SENDS TRIP SIGNAL TO PRIMARY UNIT | | SECONDARY UNIT POWER DISCONNECT ASSEMBLY CONNECTED |

FIG. 11

MECHANICAL INTERLOCKING SYSTEM

| CONDITION/INTERLOCK | PRIMARY UNIT 50$_1$ | SECONDARY UNIT 50$_2$ | BYPASS UNIT 10 |
|---|---|---|---|
| PRIMARY UNIT POWER DISCONNECT ASSEMBLY DISCONNECTED | PADLOCK POWER DISCONNECT ASSEMBLY OFF | ENERGIZED | IN BYPASS MODE |
| SECONDARY UNIT POWER DISCONNECT ASSEMBLY DISCONNECTED | ENERGIZED | POWER DISCONNECT ASSEMBLY PADLOCK OFF | IN PRIMARY MODE |
| AUTO BYPASS MODE | ISOLATED PRIMARY UNIT SAFE TO MAINTAIN | AUTO BYPASS CONTACTOR ENGAGED | BYPASS UNIT OPERATING MECHANISM OF ISOLATED BREAKER PADLOCKED IN BYPASS MODE |
| MECH INTERLOCKING KEY BYPASS MODE | | SINGLE KEY ENABLES A BREAKER TO BE OPERATED | |
| MECH INTERLOCKING KEY PRIMARY MODE | SINGLE KEY ENABLES A BREAKER TO BE OPERATED | | |

FIG. 12

ELECTRICAL POWER DISTRIBUTION SYSTEMS WITH A BYPASS UNIT THAT COUPLES TO A LOAD AND ELECTRICALLY ENGAGES ONE OF TWO ALTERNATE UNITS FOR POWERING THE LOAD AND RELATED METHODS

RELATED APPLICATIONS

This application claims the benefit of and priority to U.S. Provisional Application Ser. No. 62/867,995, filed Jun. 28, 2019, the content of which is hereby incorporated by reference as if recited in full herein.

FIELD OF THE INVENTION

The present invention relates to electrical distribution systems and is particularly suitable for motor control centers.

BACKGROUND OF THE INVENTION

In general, electrical power distribution systems distribute electrical power from power sources, such as private or public power grids, to different loads, such as motors. As a specific example, motor control centers (MCC) distribute electrical power to and control motors in a central location. MCCs can include structures, cabinets or enclosures containing a common power bus and multiple, typically modular, bucket assemblies or units, which generally contain a motor starter of various types, a circuit breaker or fuse(s), and a power disconnect. See, e.g., U.S. Pat. No. 4,024,441, the contents of which are hereby incorporated by reference as if recited in full herein. Eaton Corporation has recently introduced a MCC product line with compact bucket assemblies that conveniently plug into a slot, compartment or space in an MCC structure. The product is sold under the product name, Freedom 2100 MCC. See also, U.S. Pat. No. 8,934,218, the contents of which are hereby incorporated by reference as if recited in full herein.

SUMMARY OF EMBODIMENTS OF THE INVENTION

Embodiments of the invention are directed to enclosed bypass units that can connect to separate primary and secondary units with motor starters, allowing for one to power a load at any one time through the bypass unit while electrically isolating the other thereby providing redundant powering options which can electrically isolate the primary and secondary units from a load and/or line side bus and each other.

Embodiments of the invention are directed to electrical power distribution systems that include: a power bus; a bypass unit with a power transfer switch coupled to a load; a first unit having a first disconnect switch configured to couple the power bus to the power transfer switch; and a second unit having a second disconnect switch configured to couple the power bus to the power transfer switch. The power transfer switch has mechanically interlocked first and second contactors configured to selectively couple only one of the first and second units to the load at any one time. The bypass unit includes a circuit breaker configured to couple the first unit to the first contactor. The circuit breaker has an operator mechanism configured to be moved between ON and OFF positions to close and open the circuit breaker, respectively, and configured to allow a user to lock the operator mechanism in the ON or OFF position. When the first disconnect switch is closed and the power transfer switch couples the first unit to the load, the second disconnect switch is open to electrically isolate the second unit from the load and the first unit and when the first disconnect switch is closed and the power transfer switch couples the second unit to the load, the first disconnect switch is open to electrically isolate the first unit from the load and the second unit. At any one point in time during normal operation, the power transfer switch of the bypass unit is configured to electrically connect the power bus to the load using only one of the first unit or the second unit. When the power transfer switch couples the first unit to the load, the first disconnect switch is closed while the second disconnect switch is open to electrically isolate the second unit from the load and the first unit, and when the power transfer switch couples the second unit to the load, the second disconnect switch is closed while the first disconnect switch is open to electrically isolate the first unit electrically from the load and the second unit.

The first disconnect switch can include a first circuit breaker and the second disconnect switch can include a second circuit breaker. The first and second circuit breakers and the power transfer switch can be electrically interlocked, such that, when the power transfer switch couples one of the first and second units to the load, only the associated first or second circuit breaker can be closed.

The power transfer switch can further include at least one auxiliary switch coupled to the circuit breakers that is configured to transmit a trip signal to the circuit breaker of the first disconnect switch when the power transfer switch couples the second unit to the load.

Embodiments of the invention are directed to electrical power distribution systems that include a bypass unit with a power transfer switch. The power transfer switch includes mechanically interlocked first and second contactors configured to electrically couple to a load and define first and second electrical paths where only one of the first and second contactors close at any one time. The bypass unit further includes a circuit breaker in the bypass unit coupled to the first electrical path to thereby inhibit feedback to an isolated unit. The circuit breaker has an externally accessible operator handle that faces a front of the bypass unit and is configured to allow a user to lock the handle in an off position associated with non-conduction in the first electrical path. The electrical distribution device also include a first unit with a first disconnect switch electrically coupled to the first electrical path of the power transfer switch and electrically coupled to a circuit breaker and a second unit with a second disconnect switch electrically coupled to the second electrical path of the power transfer switch. At any one point in time during normal operation, the power transfer switch of the bypass unit is configured to electrically connect a power bus to the load using only one of the first unit or the second unit. When the power transfer switch electrically connects the first unit to the load, the first disconnect switch is electrically on and allows conduction in an electrically active (energized) state while the second disconnect switch is electrically off and in an electrically inactive (non-energized) state with the second unit electrically isolated from the load and the first unit. When the power transfer switch electrically connects the second unit to the load, the second disconnect switch is electrically on and allows conduction in an electrically active (energized) state while the first disconnect switch is electrically off and in an electrically inactive (non-energized) state with the first unit electrically isolated from the load and the second unit.

The first and second units can each further comprise a power disconnect assembly with extendable/retractable power stabs that move relative to a rear of the first and second units, respectively, to connect and disconnect from the power bus. Only a single one of the first and second units can be operated to have power stabs that are in an extended state to connect to the power bus at any one time.

The bypass unit can have an enclosure with a front wall, side walls and a rear wall and can be devoid of power stabs and does not directly connect to the power bus.

Each of the bypass unit, the first unit and the second unit can be held in separate housings and are independently slidably removable from a respective compartment in at least one structure of the electrical distribution device.

The first unit can include a first motor starter and the second unit can include a second motor starter. The electrical distribution device can further include at least one structure with defined spaced apart internal compartments that slidably hold the bypass unit, the first unit and the second unit in different ones of the defined spaced apart internal compartments. The first unit can have a first front door with a first disconnect operator handle in communication with the first disconnect switch. The second unit can have a second front door with a second disconnect operator handle in communication with the second disconnect switch. The electrical distribution device can include interlocks that (a) prevent the first door from opening when either the first disconnect switch is on or the first motor starter is electrically coupled to the load and (b) prevent the second door from opening when either the second disconnect switch is on or the second motor starter is electrically coupled to the load.

The bypass unit and the first and second units can reside inside spaced part compartments of a structure defining internal compartments. The second electrical path in the bypass unit can be devoid of a circuit breaker.

The bypass unit can further include a manually activatable back-up bypass path as a third path in the bypass unit comprising a circuit breaker that connects the load to the second unit without requiring the second path from the second contactor. Optionally the third path and the second path can merge in the bypass unit to a common conductor output from the bypass unit. The common conductor output can be configured to couple to only one unit, i.e., only the second unit.

The first and second disconnect switches can be circuit breakers. At least one of the bypass unit or the first and second disconnect switches can be electrically coupled to cause a first one of either the first disconnect switch or the second disconnect switch to trip to an open state when a second one of the first disconnect switch or the second disconnect switch is on to allow conduction whereby only a single one of the first or second disconnect switch is in an on state at any one time.

The electrical power distribution device can be a motor control center (MCC).

The first disconnect switch and the second disconnect switch can each include a circuit breaker. The power transfer switch can include auxiliary switches that are configured to automatically transmit a trip signal to the first unit prior to or concurrently with engaging the second contactor.

The electrical distribution device can further include a relay system coupled to the first unit. The relay system can be configured to detect a malfunction or power off event of the first unit and then (i) direct the power transfer switch to automatically transfer power from the first unit and the first electrical path to the second unit and the second electrical path to the load and (ii) automatically directly or indirectly via an auxiliary switch transmit a control signal to the circuit breaker in the bypass unit to cause the circuit breaker to trip.

The first unit and the second unit can be provided as one of options A-L:

| Option | first unit | second unit |
| --- | --- | --- |
| A | VFD unit | VFD unit |
| B | Soft Starter (Reduced Voltage starter) unit | Soft Starter (Reduced Voltage starter) unit |
| C | NEMA Starter unit | NEMA Starter unit |
| D | IEC Starter unit | IEC Starter unit |
| E | VFD unit | Soft Starter (Reduced Voltage starter) unit |
| F | Soft Starter (Reduced Voltage starter) unit | NEMA Starter unit |
| G | NEMA Starter unit | IEC Starter unit |
| H | VFD unit | NEMA Starter unit |
| I | Soft Starter (Reduced Voltage starter) unit | IEC Starter unit |
| J | VFD unit | IEC Starter unit |
| K | Feeder Breaker | Feeder Breaker |
| L | Feeder Fused | Feeder Fused |

The bypass unit can further include a first lead coupled to a first set of switch contacts of the first contactor, a second lead coupled to the second set of switch contacts of the second contactor, and a third lead configured to couple to the load, the first lead can extend from the bypass unit a distance sufficient to couple to the first unit, the second lead can extend from the bypass unit a distance sufficient to couple to the second unit, and the third lead can have a length sufficient to couple to the load.

The first and second leads can extend from the bypass unit through a wire way to connect to the respective first and second units.

The electrical distribution device can be a motor control center (MCC). The first and second units can each further include a power disconnect assembly with extendable/retractable power stabs that move relative to a rear of the first and second units, respectively, to connect and disconnect from the power bus. Only a single one of the first and second units can extend respective power stabs to connect to the power bus at any one time. The first unit and the second unit can each have a lock that, when deployed, physically (a) locks the power disconnect assembly in at least one defined position associated with one or both (i) a retracted position associated with an electrically isolated state of the respective unit or (ii) an extended position associated with engagement with the power bus and an electrically active state, and/or (b) locks a laterally movable slide from allowing access to an aperture that allows a crank to change a position of the power stabs.

The electrical power distribution device can further include at least one interlock that is configured to allow a user to open or slidably remove the first unit from the MCC only when the first unit is in the electrically isolated state and the bypass unit circuit breaker is off while allowing the second unit to be energized and power the load through the bypass unit.

Each of the first and second units can be slidably and releasably held in defined separate compartments of a structure of the electrical distribution device and each is serially interchangeable with a different corresponding unit having a common size and shape housing thereby allowing modular repair and replacement. The bypass unit can be held in a housing with a closed front door and has a height that is in a range of about 6-12 inches.

The bypass unit, the first unit and the second unit can be held in separate housings. The bypass unit, the first unit and the second unit can be configured to power a load with horsepower in a range of about ¼ horsepower to 200 horsepower. The bypass unit can have a closed front door with a front operating switch handle coupled to the power transfer switch.

The power transfer switch of the bypass unit can further include at least one auxiliary switch. The at least one auxiliary switch can be configured to transmit and/or receive control signals to/from at least one of the first or second units.

Other embodiments are directed to methods of assembling an electrical power distribution system. The methods include providing a bypass unit in a housing comprising a power transfer switch configured to electrically couple to only first and second separate units held in separate respective housings to power a load using only one of the first and second units at any one time. The power transfer switch has mechanically interlocked first and second contactors configured to electrically couple to a load and define first and second electrical paths where only one of the first and second contactors close at any one time. The bypass unit can further include a circuit breaker in the bypass unit coupled to the first electrical path to thereby inhibit feedback to an isolated unit and the circuit breaker can have an externally accessible operator handle that faces a front of the bypass unit and is configured to allow a user to lock the handle in an off position associated with non-conduction in the first electrical path. The method also includes allowing a user to select only two units as the first and second units to connect to the bypass unit from one of options A-L:

| Option | first unit | second unit |
| --- | --- | --- |
| A | VFD unit | VFD unit |
| B | Soft Starter (Reduced Voltage starter) unit | Soft Starter (Reduced Voltage starter) unit |
| C | NEMA Starter unit | NEMA Starter unit |
| D | IEC Starter unit | IEC Starter unit |
| E | VFD unit | Soft Starter (Reduced Voltage starter) unit |
| F | Soft Starter (Reduced Voltage starter) unit | NEMA Starter unit |
| G | NEMA Starter unit | IEC Starter unit |
| H | VFD unit | NEMA Starter unit |
| I | Soft Starter (Reduced Voltage starter) unit | IEC Starter unit |
| J | VFD unit | IEC Starter unit |
| K | Feeder Breaker | Feeder Breaker |
| L | Feeder Fused | Feeder Fused |

The first and second units can each include a power disconnect assembly having extendable/retractable power stabs.

The methods can further include slidably inserting the bypass unit and the selected first and second units into compartments of a structure of the electrical distribution system and electrically connecting the power transfer switch of the bypass unit to the selected first and second units during, before or after the inserting.

The electrical power distribution system can be a motor control center.

The selected first and second units and the bypass unit each have a dedicated, respective front door. The bypass unit can have a closed rear panel with a plurality of conductors extending outward therefrom including a conductor that couples to a load, and conductors that couple to the selected first and second units.

The power transfer switch of the bypass unit can have at least one auxiliary switch attached thereto and the at least one auxiliary switch can be configured to transmit and/or receive control signals to/from at least one of the first or second units.

A first set of three switch contacts of the first contactor can be coupled only to the first unit while a second set of three switch contacts of the second contactor, different from the first set of three switch contacts, can be coupled only to the second unit to thereby serially couple the load to the first unit and the second unit via the bypass unit. Optionally, the bypass unit can further include a manually activatable back-up bypass path with a circuit breaker that connects the load to the second unit.

Yet other embodiments are directed to a bypass unit. The bypass unit include: a housing comprising a rear wall, a front panel, opposing side walls, a floor and a ceiling defining an enclosure. The housing holds a bypass circuit with a power transfer switch. The power transfer switch includes mechanically interlocked first and second contactors configured to electrically couple to a load and define first and second electrical paths where only one of the first and second contactors close at any one time. The bypass unit can further include a circuit breaker in the bypass unit coupled to the first electrical path to thereby inhibit feedback to an isolated unit, wherein the circuit breaker has an externally accessible operator handle that faces a front of the bypass unit and is configured to allow a user to lock the handle in an off position associated with non-conduction in the first electrical path. The bypass unit also includes a first conductor coupled to a first set of three switch contacts of the first contactor; a second conductor coupled to a second set of three switch contacts of the second contactor; and a third conductor coupled to a load side of the power transfer switch and extending out of the housing with a length sufficient to couple to a load. The first and second conductors extend a length outside the housing. The first conductor is configured to electrically couple a first unit with a first motor starter with the first set of switch contacts and the second conductor is configured to electrically couple a second unit with a second motor starter to the second set of switch contacts.

The housing can have a height in a range of about 6-12 inches.

The power transfer switch can be configured to power a load from a power bus to the load using the second unit only when a disconnect switch of the first unit and the circuit breaker of the bypass unit are in an off state associated with non-conduction to thereby provide electrical isolation of the first unit allowing a user to access or remove the first unit from a structure while the second unit is powering the load through the bypass unit.

The housing can be rectangular and configured to be slidably and releasably held in a compartment of a structure of an electrical distribution device.

The bypass unit can further include at least one auxiliary switch in the bypass unit coupled to the power transfer switch. The at least one auxiliary switch can be configured to transmit and/or receive control signals to/from at least one of the first or second units.

The bypass unit can further include a manually activatable back-up bypass path with a circuit breaker that is configured to connect the load to the second unit as a back-up to the second contactor. The circuit breaker of the back-up bypass path can have an operator handle. Only one of the circuit breaker of the back-up bypass path and the circuit breaker coupled to the first contactor can be in an on position associated with conduction at any one time.

Yet other aspects of the invention are directed to methods of transferring power from one unit to another unit to power a load using a motor control center (MCC). The methods include: providing an MCC with a bypass unit in a housing comprising a power transfer switch configured to serially electrically couple to a single one of first and second units held in separate respective housings to a load at any one time to thereby provide a redundant, back-up drive capacity; and mechanically interlocking first and second contactors of the power transfer switch to electrically couple either the first or the second contactor to the load at any one time and define first and second electrical paths whereby only one of the first and second contactors close at any one time. The first electrical path is electrically coupled to a circuit breaker in the bypass unit and the first unit and the second electrical path is coupled to the second unit. The methods also include electronically detecting a power failure or malfunction of the first unit; automatically transmitting a trip signal to the circuit breaker in the bypass unit; automatically engaging the second contactor and disengaging the first contactor of the power transfer switch to power the load using the second unit and the second electrical path; automatically tripping a disconnect switch in the first unit; and automatically tripping the circuit breaker in the bypass unit to thereby isolate the first unit from the load.

The methods can further include allowing a user to manually engage a back-up bypass path comprising a circuit breaker that connects the load to the second unit. The disconnect switch in the first unit can be interlocked in an off position in response to the manual engagement.

Further features, advantages and details of the present invention will be appreciated by those of ordinary skill in the art from a reading of the figures and the detailed description that follow, such description being merely illustrative of the present invention.

It is noted that aspects of the invention described with respect to one embodiment, may be incorporated in a different embodiment although not specifically described relative thereto. That is, all embodiments and/or features of any embodiment can be combined in any way and/or combination. Applicant reserves the right to change any originally filed claim or file any new claim accordingly, including the right to be able to amend any originally filed claim to depend from and/or incorporate any feature of any other claim although not originally claimed in that manner. These and other objects and/or aspects of the present invention are explained in detail in the specification set forth below.

BRIEF DESCRIPTION OF THE DRAWINGS

FIG. 11 is a table of actions/conditions an electrical interlocking system for electrical distribution systems according to embodiments of the present invention.

FIG. 12 is a table of actions/conditions for a mechanical interlocking system according to embodiments of the present invention.

DETAILED DESCRIPTION OF EMBODIMENTS OF THE INVENTION

Figure 1:
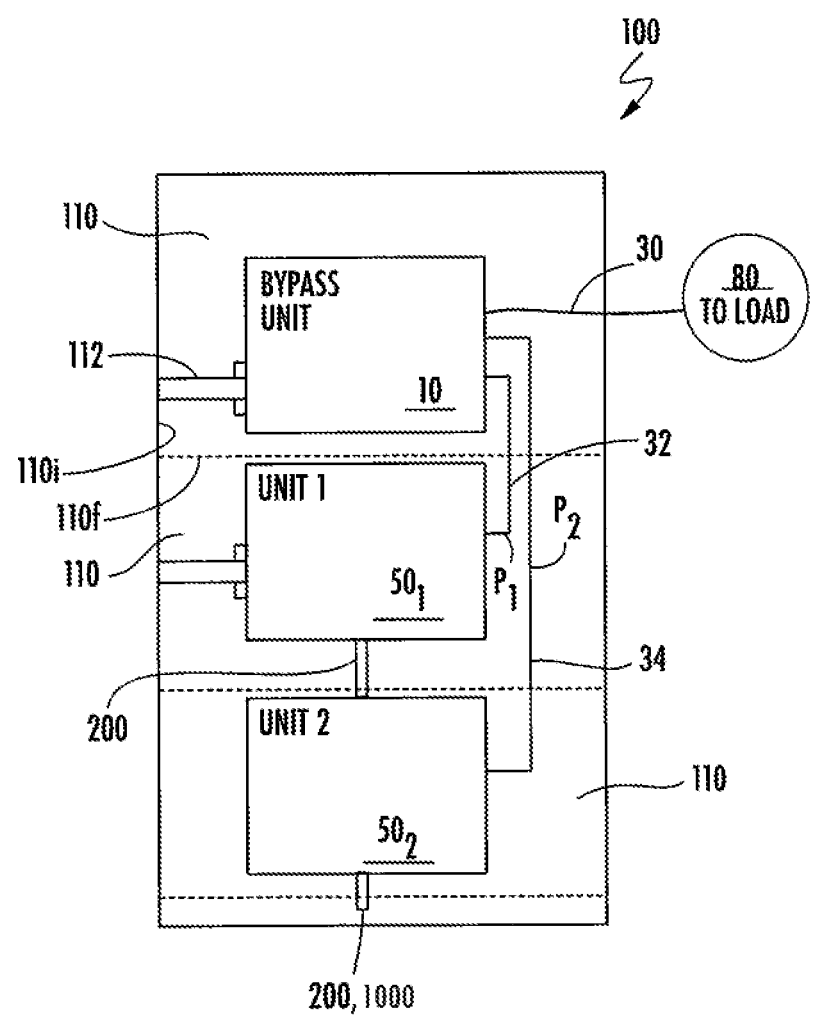
FIG. 1 is a schematic diagram of an exemplary electrical power distribution system according to embodiments of the present invention.

The present invention now will be described more fully hereinafter with reference to the accompanying drawings, in which illustrative embodiments of the invention are shown. Like numbers refer to like elements and different embodiments of like elements can be designated using a different number of superscript indicator apostrophes (e.g., 10, 10', 10", 10'").

In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device or system in use or operation in addition to the orientation depicted in the figures. For example, if the device or system in the figures is turned over, elements described as "below" or "beneath" other elements or features would then be oriented "above" the other elements or features. Thus, the exemplary term "below" can encompass both an orientation of above and below. The device or system may be otherwise oriented (rotated 90° or at other orientations) and the spatially relative descriptors used herein interpreted accordingly.

The term "about", when used with a number, refers to numbers in a range of +/−20% of the noted value(s).

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

The terms "operating mechanism" and "operator mechanism" are used interchangeably and refer to an assembly that is a primary disconnect for a unit and typically has a manually operative lever for opening and closing separable contacts in a circuit breaker and/or for turning power ON and OFF using a switch associated with a fuse (e.g., a fused disconnect). When a disconnect switch (e.g., circuit breaker) of the operator mechanism is ON and connected to a power bus, the unit is energized.

The terms "bucket assembly", "bucket", "control unit," and "unit" are used interchangeably and refer to a housing (typically a protective metal shell) that contains a disconnect switch, such as an isolation switch (for a bypass unit), a fused disconnect switch, or a circuit breaker (which can be manually operated by an operator mechanism) for controlling energization/de-energization of the power circuit in the unit. A unit can also include other components such as a power transformer, PLCs (programmable logic controllers), position sensors and the like.

The unit can be a motor starter unit, a feeder unit, a unit with a transfer switch or any other unit type. The term "motor starter" is used herein to refer to any starter type. The motor starter can be, for example, a variable frequency drive (VFD) (also known as a variable speed drive), a soft starter (reduced voltage starter), a NEMA starter (NEMA contactor and overload relay, or an IEC starter (IEC contactor and overload relay). The unit can comprise a feeder such as a feeder with a circuit breaker ("feeder breaker") or a feeder with a disconnect switch with a fuse ("feeder with fused disconnect switch"), a lighting contactor, a resistive contactor or an ATS (automatic transfer switch), by way of further example.

The term "disconnect switch" when used with respect to a unit refers to a switch in or on the unit for controlling energization or de-energization of the unit, including a circuit breaker or a switch for opening and closing separable contacts in, e.g., a circuit breaker and/or for turning power ON and OFF using a switch associated with a fuse (e.g., a fused disconnect).

The terms "load" and "load device" are used interchangeably and are intended to mean devices that consume electrical power and that are connected to and controlled by the electrical power distribution system (e.g., a motor control center). Load devices are typically motors but may also be pumps or other machinery that may comprise motors or pumps or other miscellaneous critical loads such as hospitals, dam emergency pumps, data centers, back-up generator systems and the like.

Referring to FIG. 1, one embodiment of an electrical power distribution system 100 (e.g., a motor control center) is shown. The electrical power distribution system 100 includes a bypass unit 10 with a power transfer circuit 20, a first unit $50_1$ and a second unit $50_2$. As shown, the electrical power distribution system 100 includes a structure with compartments 110, a wire way 100w (FIG. 4, for example), a power bus 200, units $50_1$, $50_2$ and a bypass unit 10 for providing power from the power bus 200 of a power bus bar system 1000 (FIG. 7B, for example) to an external load 80. The electrical power distribution system 100 can include more than two units $50_1$, $50_2$ and the bypass unit 10 as shown in FIG. 8, for example.

Embodiments of the invention can allow for electrical isolation of one of the units $50_1$, $50_2$, from the other of the units $50_1$, $50_2$, while the other unit is operational, online, and providing power to the load 80, thereby providing a continuous operational system while also providing increased safety for a technician. For example, since the primary or first unit $50_1$ is electrically isolated from the secondary or second unit $50_2$, a technician can access the first unit $50_1$ which is offline and electrically isolated from the second unit $50_2$, the power bus 200 (FIGS. 1, 4) and the load 80, while the second unit $50_2$ is operational, online, and providing power to the load 80, thereby providing a continuous operational system while also providing increased safety for a technician.

Embodiments of the invention can also provide for physical separation/isolation of the first and second units $50_1$, $50_2$ and the bypass unit 10 from each other in compartments 110 of the structure 100 using barriers such as partitions, walls, ceilings and floors, for example.

Figure 2A:
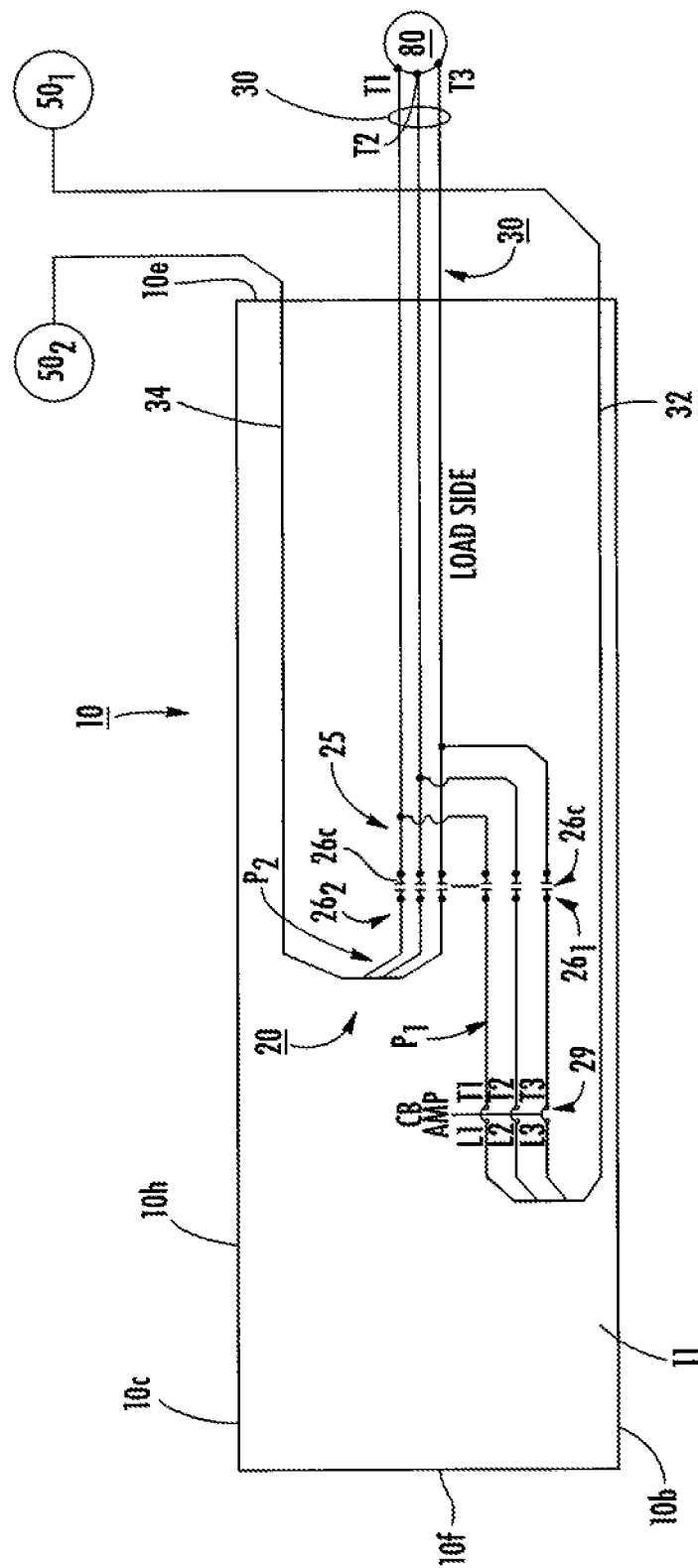
FIG. 2A is a schematic illustration of an exemplary bypass unit according to embodiments of the present invention.

Referring to FIG. 2A, an example bypass unit 10 is shown. As shown, the bypass unit 10 includes a housing 10h that encloses the power transfer circuit 20 which comprises a power transfer (bypass) switch 25. The power transfer circuit 20 is coupled to a load 80, such as a motor 80m, via a conductor 30, shown as a three pole/three phase lead with three electrical contact connections. The term "conductor" refers to one or more cables, each of which can include one or more wires, leads or other elements that conduct electricity, or one or more wires, leads, traces, lines or other elements that conduct electricity.

Figure 4:
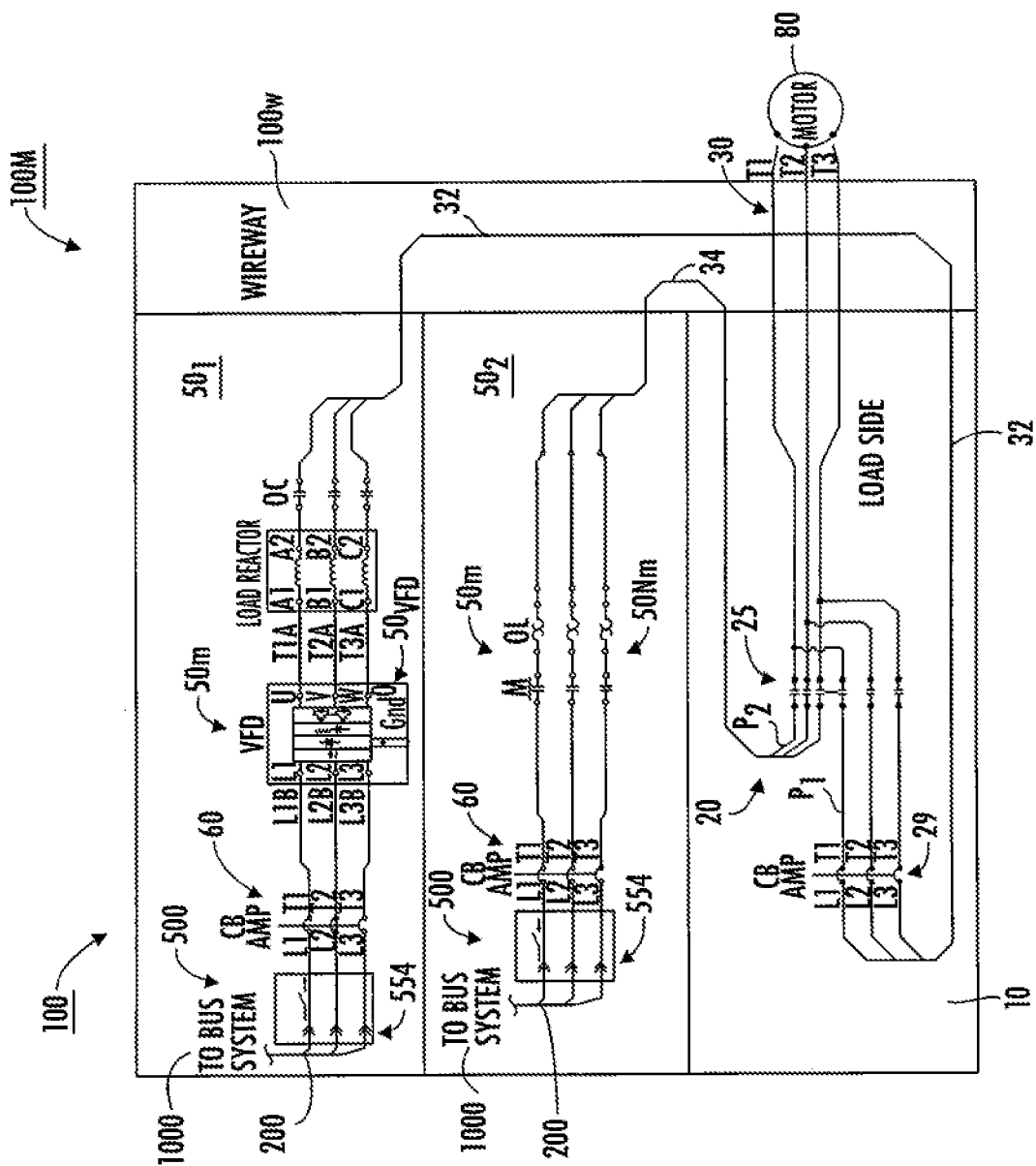
FIGS. 4-6 are schematic illustrations of electrical distribution systems according to embodiments of the present invention.
Figure 5:
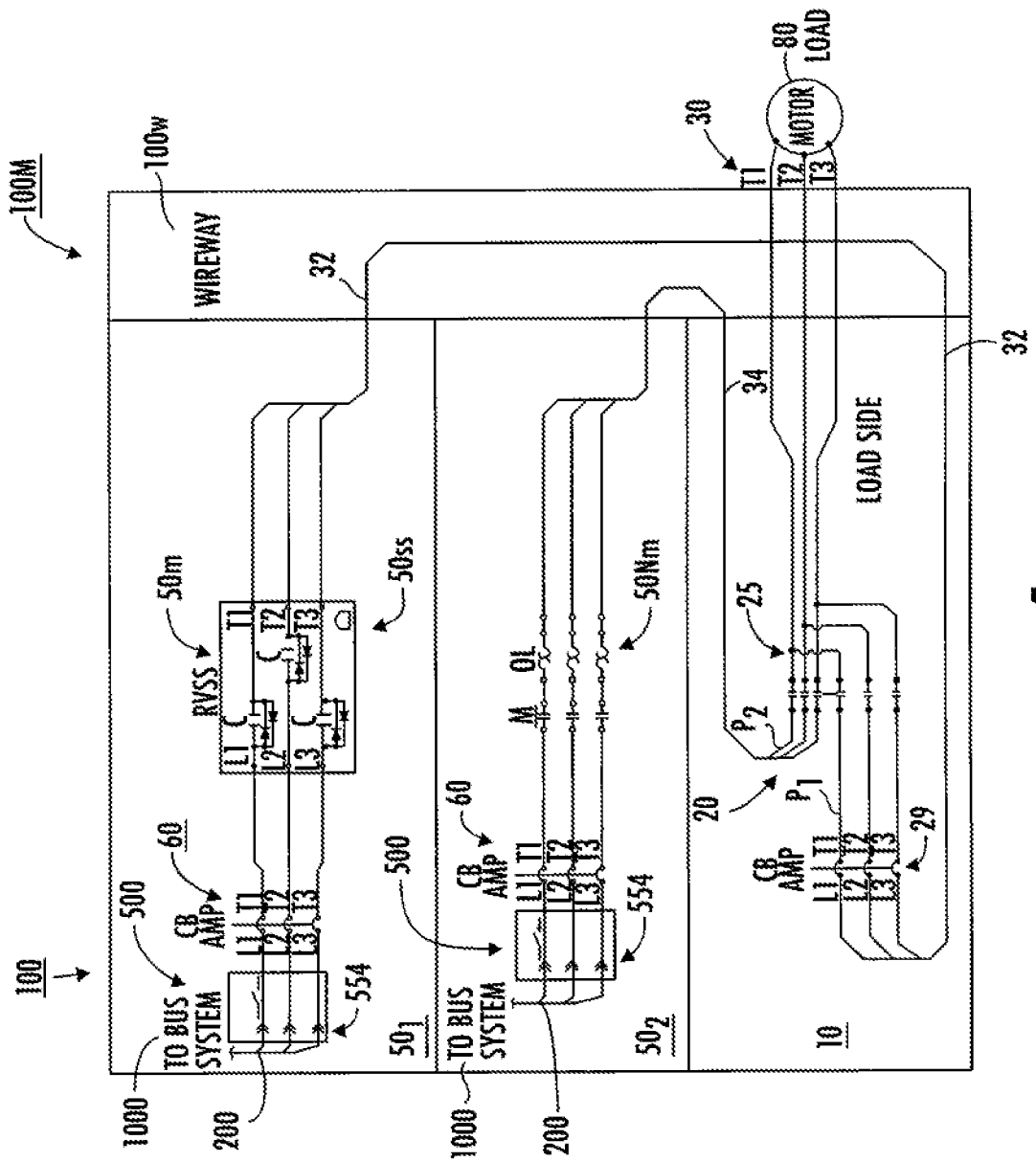
Figure 6:
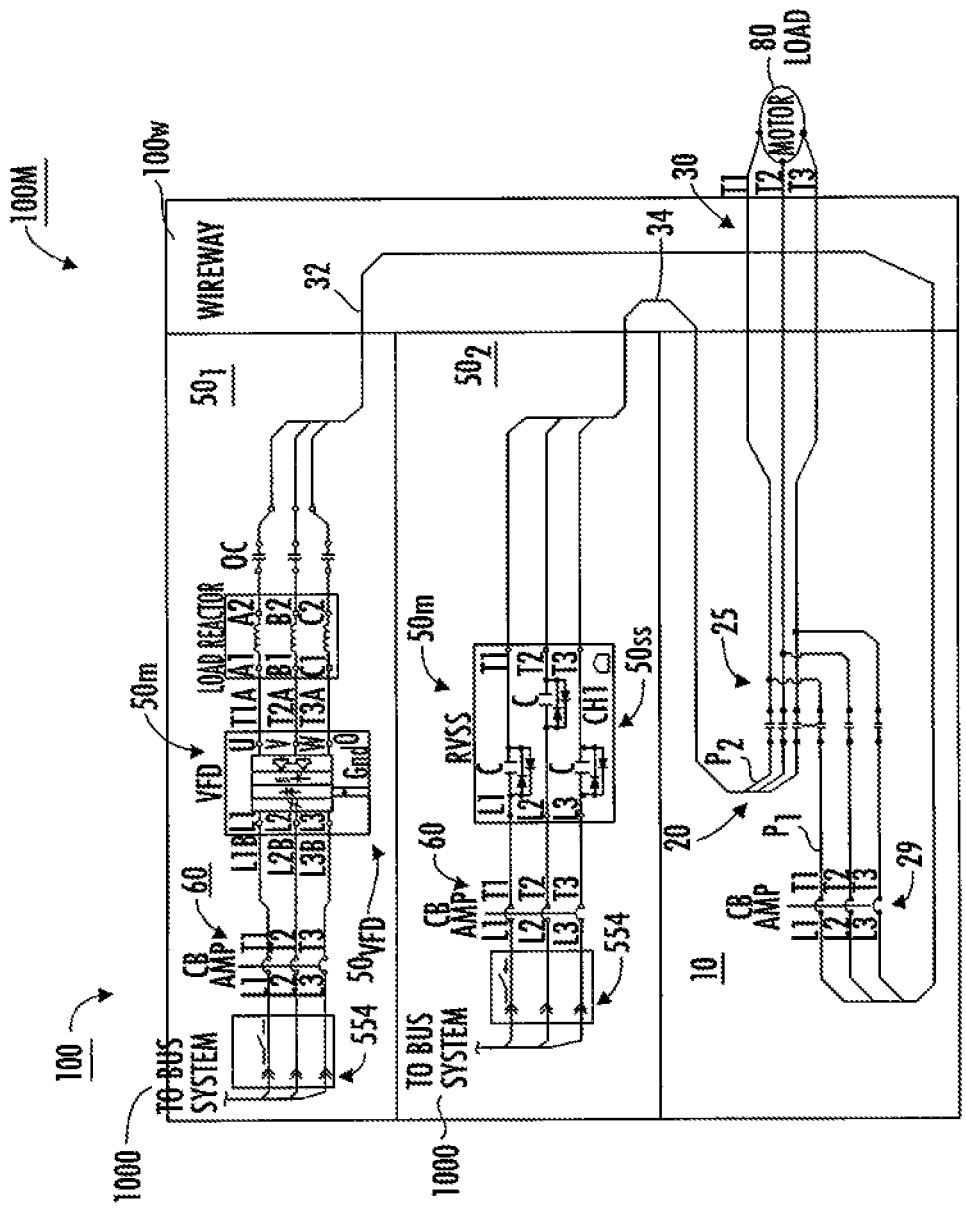

The power transfer circuit 20 is also electrically coupled to a first unit $50_1$ and a second unit $50_2$ (FIGS. 1, 3A, 3B, 4-6) via conductors 32, 34, respectively, and is configured to only electrically connect the load 80 to a single one unit of the first unit $50_1$ or the second unit $50_2$ at any one time during normal operation. The conductors 30, 32, 34 can be of the same or different lengths. The conductors 32, 34 can extend from the bypass unit 10 to the first and second units $50_1$, $50_2$, inside a wire way 100w of a structure 100, such as an MCC 100M (FIGS. 4-6).

Referring to FIGS. 2A and 4-6, the power transfer circuit 20 of the bypass unit includes a power transfer switch 25. The power transfer switch 25 comprises a mechanical interlock 125 (FIG. 7A) that mechanically interlocks the first and second contactors $26_1$, $26_2$, respectively, so that the power transfer switch 25 is configured to electrically couple to the load 80 and define a first electrical path $P_1$ and a second electrical path $P_2$ where only one of the first and second contactors $26_1$, $26_2$ close at any one time.

As shown, the bypass unit 10 can also include a circuit breaker 29 in the bypass unit 10 that is coupled to a load side of the power transfer switch 25 and also coupled to the first electrical path $P_1$ inside the bypass unit 10 between the line side of the power transfer switch 25 and the first unit $50_1$ to thereby inhibit (electrical) feedback to an electrically isolated unit, i.e., the second unit $50_2$ when the first electrical path $P_1$ is active.

Figure 2B:
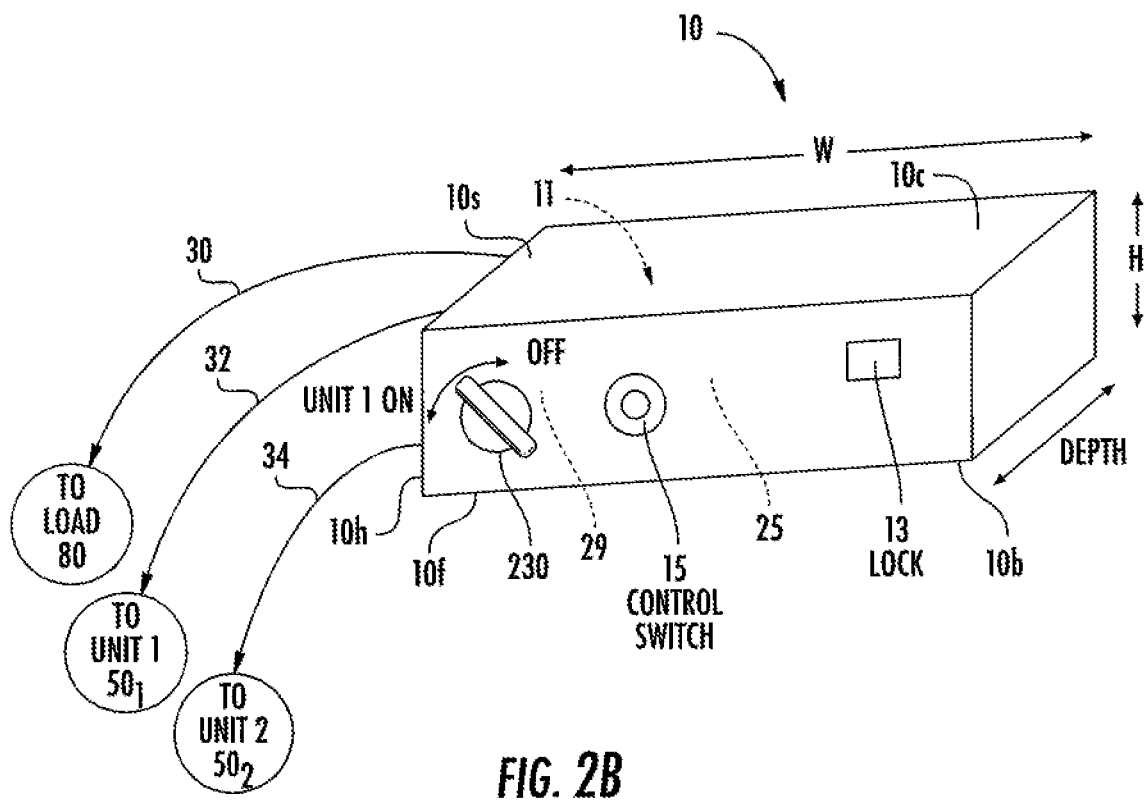
FIG. 2B is a front, side perspective view of the bypass unit shown in FIG. 2A according to embodiments of the present invention.

As shown in FIG. 2B, the circuit breaker 29 typically has an externally accessible operator handle 230 that faces a front 10f of the bypass unit 10 and is configured to be externally accessible to allow a user to lock the operator handle 230 in a desired operational state, using a lock such as a padlock or scissors lock. For example, a user can lock the operator handle 230 in an OFF position associated with non-conduction in the first electrical path $P_1$ while the bypass unit 10 provides power to the load 80 from the power bus 200 to the second unit $50_2$ through the second path $P_2$, then the second contactor $26_2$ of the switch 25, then to the load 80.

Figure 2C:
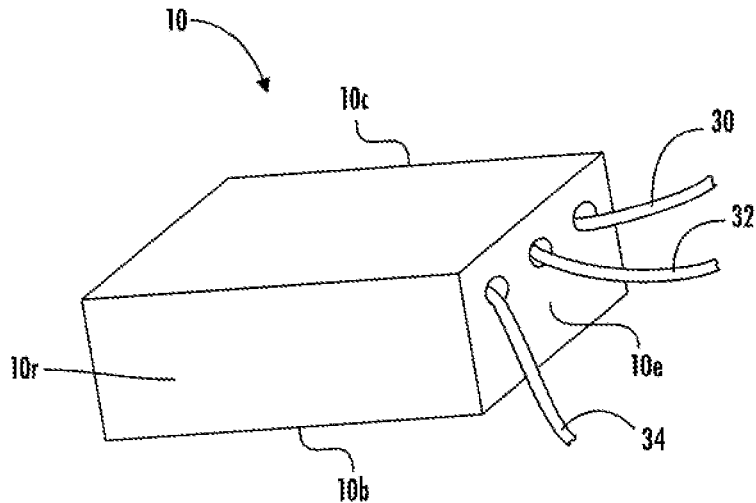
FIG. 2C is a rear, side perspective view of the bypass unit shown in FIG. 2A according to embodiments of the present invention.

As shown in FIGS. 2B and 2C, the bypass unit 10 has a front panel 10f, sidewalls 10s, a ceiling 10c, a floor 10b and a back wall 10r that defines an enclosed compartment 11 and does not require, and typically does not have, power stabs (for engaging a power bus) that extend out from the back wall 10r. A plurality of conductors 30, 32, 34 extend out of the housing 10h, typically one of the side walls 10s, shown as the right side wall 10e (FIG. 2C). The term "right side" refers to the orientation when held in a structure for normal operation with the front 10f facing forward. The incoming wires (e.g., nine wires, three associated with each conductor 30, 32, 34) can be fed into the bypass unit 10 through one side of the unit and into a wire way 100w (FIG. 4) and the rear 10r of the housing 10h can be a closed panel. The bypass unit 10 can electrically isolate each of the first unit $50_1$ and the second unit $50_2$ from the load 80 and/or from each other while respective front panels 50f (FIGS. 1, 3A, 3B) remain closed and typically locked in the closed position.

In some embodiments, the housing 10h of the bypass unit 10 can define an enclosure with a solid back wall 10r with the conductors 30, 32, 34 extending from a common portion or different portions of the housing 10h via a ceiling, floor, sidewall or back wall. The housing 10h can be a 1X size housing (about 6 inches tall) or a 2X size housing (about 12 inches tall) in some embodiments.

As shown in FIG. 2B, the bypass unit 10 can include a (pilot) control switch 15 to electrically activate an automatic bypass mode of the unit 10 whereby the power transfer switch 25 engages the second electrical path $P_2$ and the second contactor $26_2$ of the switch 25 and second unit $50_2$. The control switch 15 allows a user to manually activate the automatic bypass switch 25 of the power transfer circuit 20 to automatically electronically transfer to a bypass mode transferring power from the power bus 200 to the primary or first unit $50_1$ through the first path $P_1$ of the bypass switch 25 to the load 80 is switched from the power bus 200 to the bypass or second unit $50_2$ through the second path $P_2$ and the second contactor $26_2$ of the bypass switch 25 to the load 80. Example relay logic protocols are discussed below that can automatically initiate the power transfer to the second path $P_2$ if the main/primary/first unit fails. A controller and/or relay system 1510 (FIG. 7B) can, upon detection of a defined condition associated with a malfunction or failure of the first unit $50_1$, direct the power transfer circuit 20 to engage the second contactor $26_2$ and disengage the first contactor $26_1$ to power the load 80 through the second unit $50_2$.

It is contemplated that embodiments of the invention can comply with the recommendation of IEEE P1814 with respect to a reduced hazard requirement which recommends a drive unit, such as a VFD unit, be isolated. Embodiments of the invention can provide a bypass unit that couples to both primary and secondary (redundant) units with respective motor starters of the same or different motor starter types. Embodiments of the invention provide modular build options without requiring expensive, complex and larger cumbersome customizations for providing different build configurations while providing the bypass power transfer function.

Embodiments of the invention can allow for electrical isolation of one of the units $50_1$, $50_2$, from the other of the units $50_1$, $50_2$, while the other unit is operational, online, and providing power to the load 80, thereby providing a continuous operational system while also providing increased safety for a technician. For example, since the primary or first unit $50_1$ is electrically isolated from the secondary or second unit $50_2$, a technician can access the first unit $50_1$ which is offline and electrically isolated from the second unit $50_2$, the power bus 200 (FIGS. 1, 4) and the load 80, while the second unit $50_2$ is operational, online, and providing power to the load 80, thereby providing a continuous operational system while also providing increased safety for a technician.

Referring to FIG. 2B, the handle 230 can be a lever or handle of an operator mechanism that can be physically moved and configured to engage a lock so as to be able to be physically locked (e.g., padlocked) in an OFF or ON position, ON for when unit one $50_1$ is energized, connected to the power bus 200/1000 and to the first contactor $26_1$ to power the load 80 through the first unit $50_1$ and OFF for when the second unit $50_2$ is energized, connected to the power bus 200/1000 and to the second contactor $26_2$ to power the load through the second unit $50_2$. The handle 230 can include, e.g., a rotary lever or an up-down lever.

Still referring to FIG. 2B, the bypass unit 10 can also optionally include a lock 13 that locks the front panel 10f (which can be a front door that pivots open from a side) closed so that a technician cannot open the front panel or door 10f when the lock is deployed. The lock 13 can be a physical/mechanical interlock that locks the front panel or door 10f in a closed position.

One or all of the units 10, $50_1$, $50_2$ (FIGS. 1, 3A, 3B) can be configured as a modular unit to allow the internal components to be assembled as a unit 10, $50_1$, $50_2$ that can be easily, typically slidably and replaceably, installed into a compartment 110 of a structure 100 (FIGS. 1, 3A, 3B) such as an enclosure, a cabinet, and/or a motor control center (MCC) 100M (FIGS. 4-6). Embodiments of the invention provide modular (plug and play) configurations which can provide economic advantages to known conventional custom bypass designs that are cumbersome and may not provide the additional electrical isolation allowed by embodiments of the present invention. To be clear, the term "modular" refers to units that have defined standardized dimensions so that one unit of one type is replaceably interchangeable with another unit of that type.

Referring again to FIG. 2B, the bypass unit 10 can be provided in package or frame sizes of about 6 inches to about 72 inches (tall) in a height dimension "H" with substantially common depth and width dimensions, known as 1X (6 inches) to 12X (72 inches) sizes. The sizes can be in single X increments, from 1X, 2X, 3X, 4X, 5X, 6X, 7X, 8X, 9X, 10X, 11X and 12X. Thus, a 5X unit 10 can be about 30 inches tall. In some embodiments, the bypass unit 10 can be a 1X unit with a height "H" of about 6 inches or a 2X unit with a height H of about 12 inches. The frame sizes can be provided for target operational amperages, including a plurality of: 125 A, 150 A, 225 A, 250 A, 400 A, 600 A, 1200 A and 2000 A, for example.

Figure 3A:
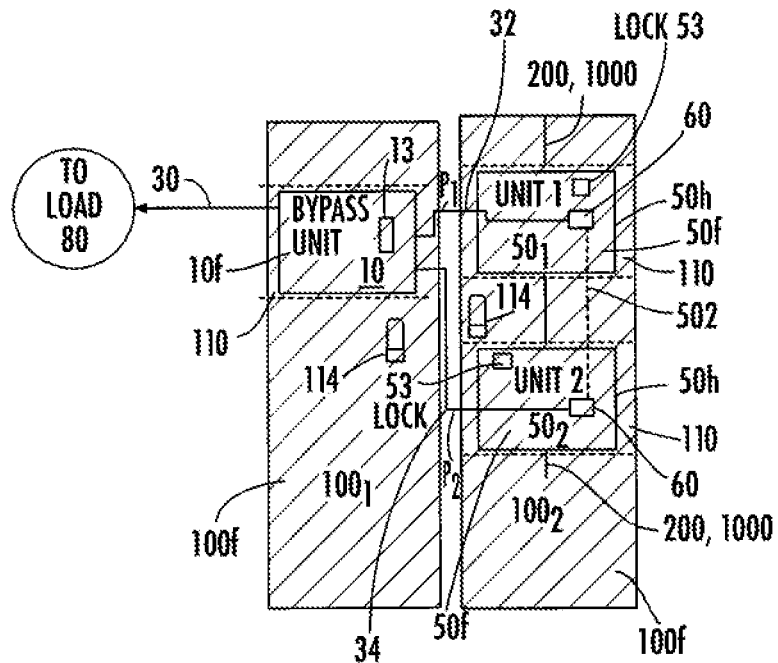
FIGS. 3A and 3B are box diagrams of electrical distribution systems according to embodiments of the present invention.
Figure 3B:
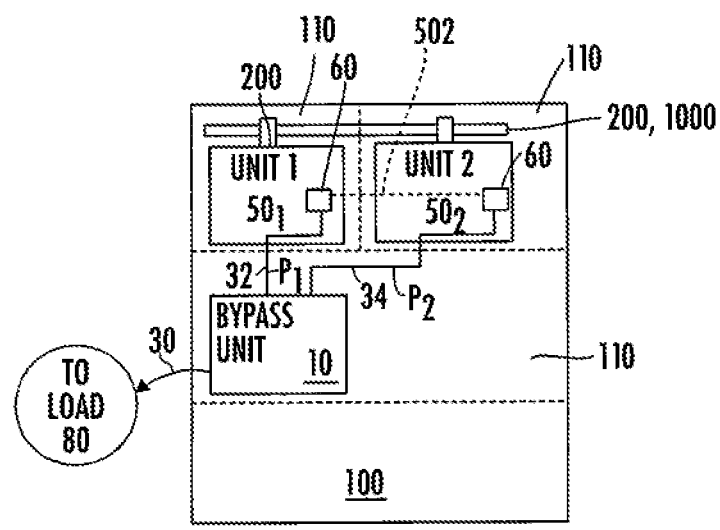

FIGS. 1, 3A, 3B illustrate that the bypass unit 10 can be placed in a compartment 110 of a structure of the power distribution system 100 and electrically coupled to the first unit $50_1$ and the second unit $50_2$. The first and second units $50_1$, $50_2$ can each include a respective motor starter 50m (FIGS. 4-6) and a respective disconnect switch 60. Each unit $50_1$, $50_2$ can include a front panel or door 50f.

The front door 50f of each unit $50_1$, $50_2$ may be configured to engage at least one lock 53 that, when deployed, can lock the door 50f in the closed position. The lock 53 can be a physical mechanical interlock.

As shown in FIGS. 1, 3A, 3B, a conductor 502 can couple the first and second units $50_1$, $50_2$ and can allow the first unit $50_1$ can transmit a trip signal to the disconnect switch 60 (e.g., circuit breaker) of the second unit $50_2$ when the first unit $50_1$ is selected by the power transfer circuit 20 via the power transfer switch 25 to create the electrical path to power the load 80 via the bypass unit 10. Likewise, the second unit $50_2$ can transmit a trip signal to the disconnect switch 60 (e.g., circuit breaker) of the first unit $50_1$ when the second unit $50_2$ is selected by the power transfer circuit 20 via the bypass switch 25 to create the electrical path to power the load 80 via the bypass unit 10. This can provide an extra degree of safety via an electrical interlock system.

Figure 7A:
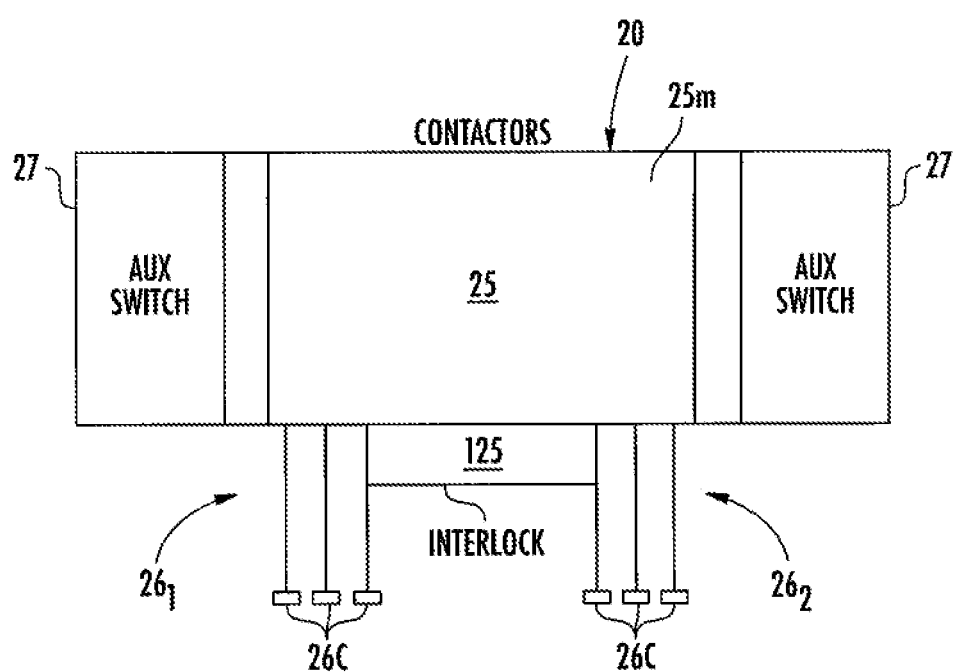
FIG. 7A is an enlarged front view of a transfer switch and deadfront switch handle suitable for the bypass unit shown in FIG. 2B according to embodiments of the present invention.
Figure 7B:
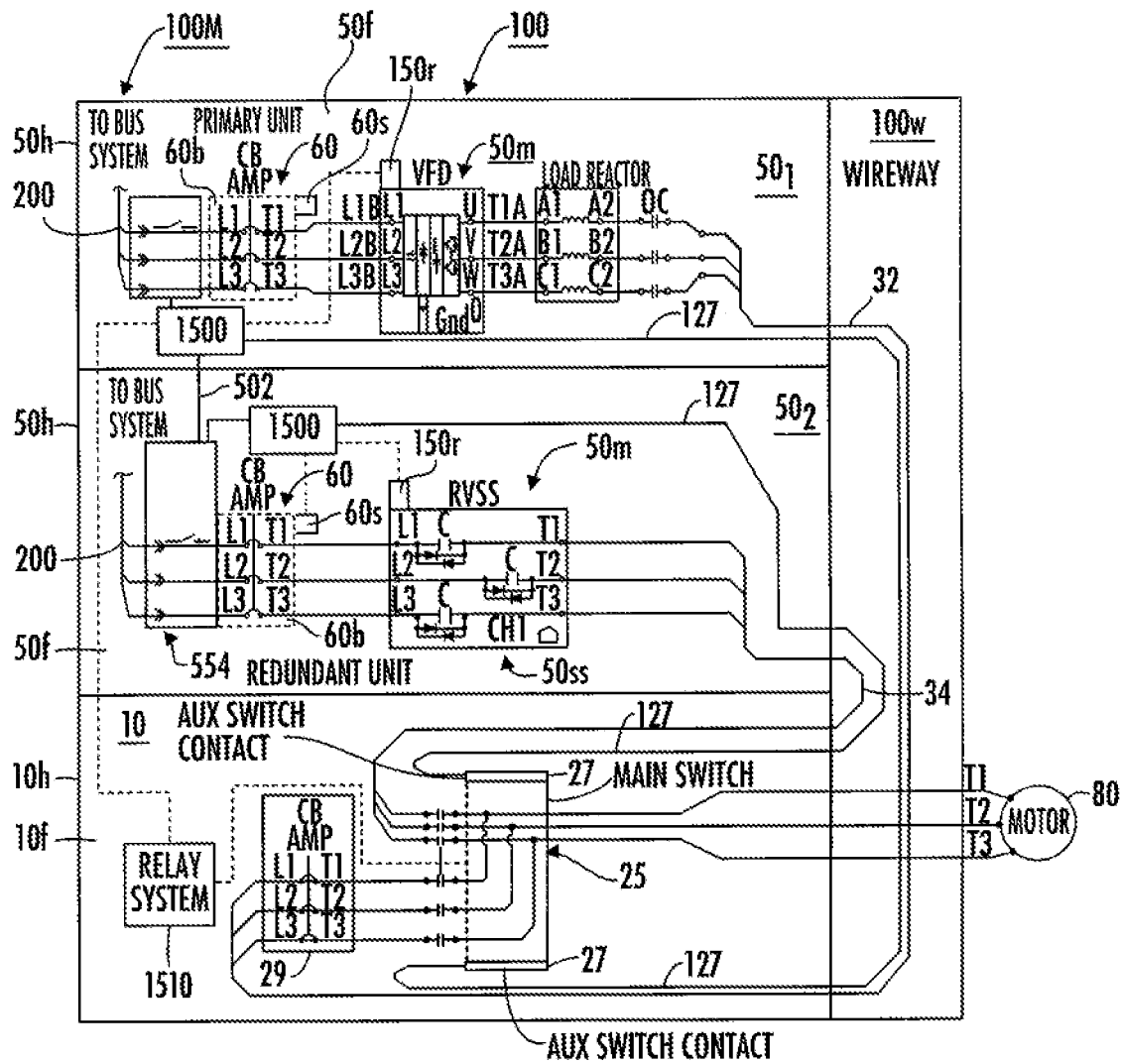
FIG. 7B is a schematic illustration of an electrical distribution system according to embodiments of the present invention.
Figure 8:
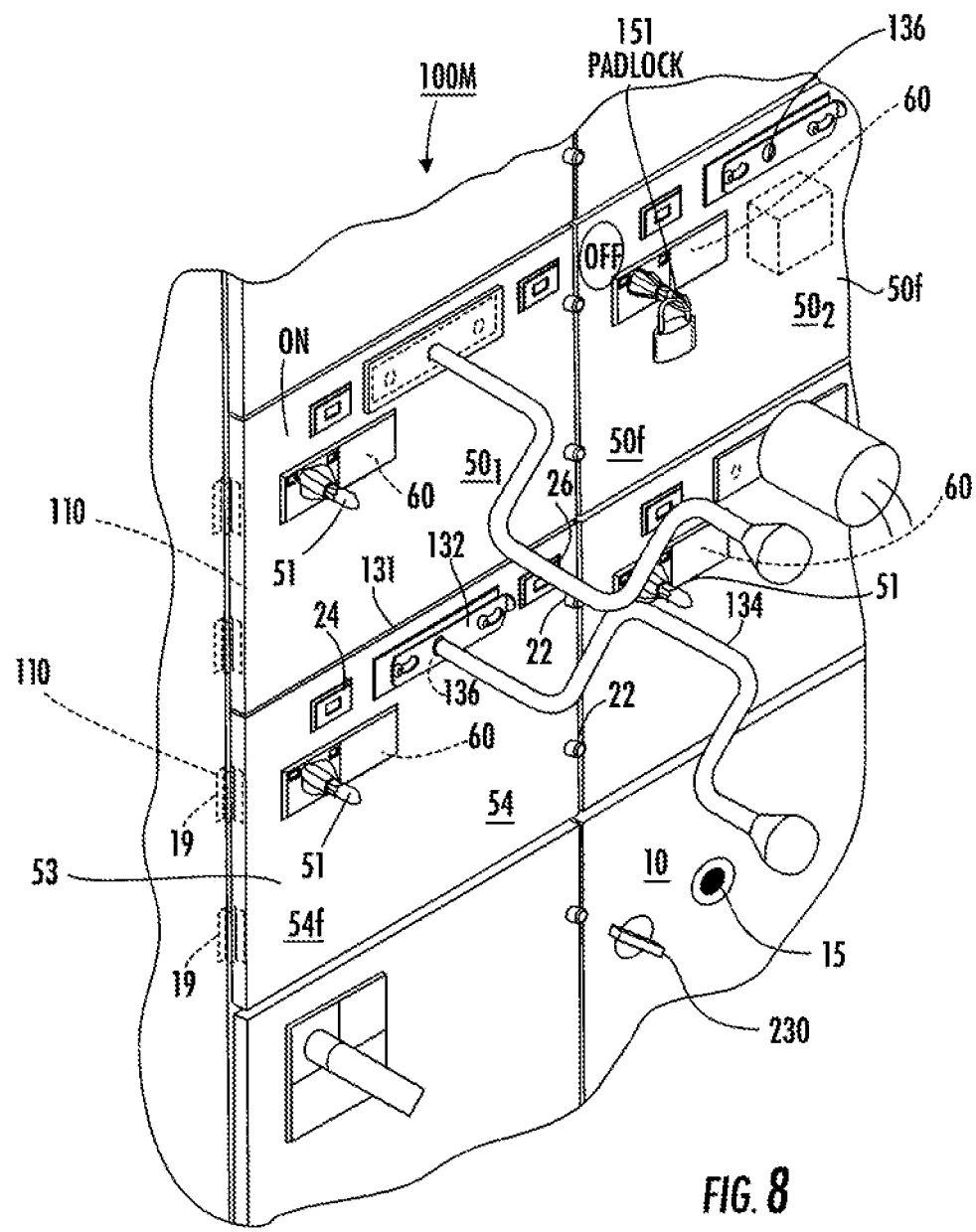
FIG. 8 is a partial front side perspective view of a motor control center (MCC) according to embodiments of the present invention.

In some embodiments, each disconnect switch 60 of the first and second units $50_1$, $50_2$ includes a circuit breakers 60b with a shunt trip 60s as shown schematically in FIG. 7B. The terms "shunt trip" and "shunt trip coil" are used interchangeably herein and are well known components of circuit breakers.

The power transfer switch 25 of the bypass unit 10 can be configured with open and close switch states of each switch contact 26c (FIG. 2A) so that only one set of three switch contacts/poles is electrically active and connected to one of the first and second units $50_1$, $50_2$ at any one time to serially provide a first electrical path $P_1$ between a power bus 200 (FIG. 4), the first unit $50_1$, the bypass unit 10, and the load 80 and a second electrical path $P_2$ between the power bus 200, the second unit $50_2$, the bypass unit 10, and the load 80.

The bypass unit 10 can be configured to provide automatic power transfer (bypass) using a reverse contactor without an overload that is mechanically coupled.

Referring to FIGS. 3A, 3B and 7B, the disconnect switch 60 of the first unit $50_1$ can electrically couple to the disconnect switch 60 of the second unit $50_2$. In some embodiments, the disconnect switch 60 of each of the units $50_T$, $50_2$ comprises a circuit breaker 60b. In certain defined conditions, the first unit $50_1$ can send a trip signal to the circuit breaker 60b of the second unit $50_2$ to cause the breaker shunt trip coil 60s to trip the breaker 60b in the second unit $50_2$. In certain defined conditions, the second unit $50_2$ can send a trip signal to the circuit breaker 60 of the first unit $50_1$ to cause the breaker shunt trip coil 60s to trip the breaker 60b in the first unit $50_1$.

Referring to FIGS. 1, 2A, 2B, 3A, 3B, a conductor 502 can be coupled to the first and second units $50_1$, $50_2$ to permit signal communication therebetween, to thereby provide electrical interlocking functionality. For example, when a user selects the first unit $50_1$ to power the load by switching the user interface member 130 (e.g., operator handle of an operator mechanism) to an ON position and switching the isolation bypass switch 25 to Unit 1-ON position, the first unit $50_1$ (either or both the auxiliary switch of the circuit breaker 60b or the auxiliary relay 150r of the motor starter 50m) can transmit a trip signal to the circuit breaker 60b of the second unit $50_2$, typically via the shunt trip 60s (FIG. 7B). Likewise, the second unit $50_2$ can transmit a trip signal to the circuit breaker 60b of the first unit $50_1$, typically the shunt trip 60s (FIG. 7B), when the second unit $50_2$ is selected by the power transfer circuit 20 via the isolation bypass switch 25 to create the electrical path to power the load 80 via the bypass unit 10. This can provide an extra degree of safety via an electrical interlock system.

Referring to FIGS. 3A, 3B and 7B, the disconnect switch 60 of the first unit $50_1$ can electrically couple to the disconnect switch 60 of the second unit $50_2$. In some embodiments, the disconnect switch 60 of each of the units $50_1$, $50_2$ comprises or is a circuit breaker 60b. In certain defined conditions, the first unit $50_1$ can send a trip signal to the circuit breaker 60 of the second unit $50_2$ to cause the breaker shunt trip coil 60s to trip the breaker in the second unit $50_2$. In certain defined conditions, the second unit $50_2$ can send a trip signal to the circuit breaker 60b of the first unit $50_1$ to cause the breaker shunt trip coil 60s to trip the breaker in the first unit $50_1$.

The first unit $50_1$, for ease of discussion can be referred to as a "primary unit", and a second unit $50_2$, for ease of discussion can be referred to as a "secondary unit" that can be coupled to the bypass unit 10 for selectively powering a load 80 through the power transfer circuit of the bypass unit 10.

In some embodiments, an electrical power distribution system 100 (e.g., MCC) can include a plurality of different electrical interlocks to ensure that only one unit of units $50_1$, $50_2$ is energized and capable of providing power to the load 80 through the bypass unit 10 at any one time. FIG. 11 lists exemplary electrical interlocks. These defined conditions and associated actions can provide an electrical interlock system. FIG. 11 lists example actions of the first (primary) unit $50_1$, the second (redundant) unit $50_2$, and the bypass unit 10 providing an electrical interlocking system based on defined operative conditions or states of the first and second units $50_1$, $50_2$.

Example interlocks associated with a primary mode (when the first unit $50_1$ is powering the load 80 through the bypass unit 10) or a bypass mode (when the second unit $50_2$ is powering the load 80 through the bypass unit 10) are listed. The defined conditions can include positions of power stabs 554 optionally provided as retractable/extendable power stabs 546, 548, 550 of a power disconnect assembly 500 (FIGS. 9 and 10) whether the power stabs 546 are fully extended and connected to a power bus 1000 or retracted (FIGS. 4-6) based on position sensors 582, 594 such as one or more microswitches (FIG. 10) in the respective units $50_1$, $50_2$. Other conditions can be based on an energized status of a respective primary or secondary unit based on an auxiliary switch and/or auxiliary relay in each of the first and second units which can send a trip signal to the other unit. The bypass unit 10 can also send a trip signal to the primary $50_1$ or secondary unit $50_2$ depending on whether the bypass unit 10 is in the primary mode (trip signal to the secondary unit) or the bypass mode (trip signal to the primary unit).

However, while the power disconnect assembly 500 is believed to be desired for certain end applications/uses, it is not required. For further description of position sensors using auxiliary switches such as microswitches in a unit with a power disconnect assembly 500, see U.S. 2008/0022673 (labeled as features 82 and/or 94 in FIG. 17 of this document), the contents of which are hereby incorporated by reference as if recited in full herein. For further descriptions of example power disconnect assemblies and interlocks, see also, U.S. patent application Ser. No. 15/848,103, the contents of which are hereby incorporated by reference as if recited in full herein.

Table 1 below provides a list of example configurations of the first unit $50_1$, for ease of discussion referred to as a "primary unit", and a second unit $50_2$, for ease of discussion referred to as a "secondary unit", that can be coupled to the bypass unit 10 for serially (selectively) powering a load 80 through the power transfer circuit of the bypass unit 10.

TABLE 1

| UNIT COMBINATION OPTIONS | | |
| --- | --- | --- |
| Option | Primary Unit | Secondary unit |
| A | VFD unit | VFD unit |
| B | Soft Starter (Reduced Voltage starter) unit | Soft Starter (Reduced Voltage starter) unit |
| C | NEMA Starter unit | NEMA Starter unit |
| D | IEC Starter unit | IEC Starter unit |

TABLE 1-continued

| UNIT COMBINATION OPTIONS | | |
| --- | --- | --- |
| Option | Primary Unit | Secondary unit |
| E | VFD unit | Soft Starter (Reduced Voltage starter) unit |
| F | Soft Starter (Reduced Voltage starter) unit | NEMA Starter unit |
| G | NEMA Starter unit | IEC Starter unit |
| H | VFD unit | NEMA Starter unit |
| I | Soft Starter (Reduced Voltage starter) unit | IEC Starter unit |
| J | VFD unit | IEC Starter unit |
| K | Feeder Breaker | Feeder Breaker |
| L | Feeder Fused | Feeder Fused |

Referring to FIG. 7B, the trip signal for the electrical interlock system can be generated/transmitted via at least one interlock circuit 1500 that can include auxiliary switch inputs from one or more auxiliary switches 27 in the bypass unit 10 via conductor lead 127 and disconnect switch inputs from the first and second units $50_1$, $50_2$ via conductor lead 502, for example.

Referring to FIG. 7B, the trip signal for the electrical interlock system can be generated/transmitted via at least one interlock circuit 1500 that can include (a) one or more inputs for receiving a signal from an auxiliary switch 27 (FIG. 7A) of the bypass unit 10 via conductor 127 and (b) one or more input(s) for receiving a signal from the first and second units $50_1$, $50_2$ such as from an auxiliary switch or contact associated with the circuit breaker 60b of the disconnect switch 60 and/or an auxiliary relay 150r coupled to or in the motor starter 50m. As discussed above, the first and second units $50_1$, $50_2$ can be coupled via a conductor 502, for example. One or more of the outputs/signals from the auxiliary switch 27 and/or the interlock circuit 1500 can provide a voltage signal as a trip signal to a shunt trip 60s in a circuit breaker 60b of one of the first and second units $50_1$, $50_2$ when the other unit of the first and second units $50_1$, $50_2$ has a circuit breaker 60b that is energized.

Still referring to FIG. 7B, each motor starter 50m can be coupled to an auxiliary relay 150r that can transmit a trip signal 150s to the interlock control circuit 1500. For example, when a motor starter 50m of one of the first and second units first and second units $50_1$, $50_2$ is on and/or operating, an auxiliary relay 150r can transmit a voltage trip signal 150s to the circuit breaker 60b of the other unit to make sure that the other unit is off, contacts open, as a safety interlock feature.

In some embodiments, the auxiliary relay 150r of the motor starter (e.g., soft starter) 50m, the auxiliary switch 27 of the bypass unit 10 and an auxiliary switch 60s in the breaker 60b of first unit $50_1$ can be synchronized and/or transmit in parallel, trip signals to the second unit $50_2$ when the first unit $50_1$ is energized. The auxiliary relay 150r of the motor starter (e.g., soft starter) 50m, the auxiliary switch 27 of the bypass unit 10 and the auxiliary switch 60s in the breaker 60b of the second unit $50_2$ can be synchronized and/or transmit in parallel trip signals to the first unit $50_1$ when the second unit $50_2$ is energized.

The term "auxiliary switch" for the primary unit and the secondary unit in FIG. 11 that can send the trip signal(s) to the appropriate breaker can include one or more auxiliary switches including, for example, an auxiliary switch 582, 594 (FIG. 10) identifying a position of the retractable/ extendable power stabs, an auxiliary switch of a circuit breaker 60b (FIG. 7B) associated with a contacts closed condition, or an auxiliary relay 150r (FIG. 7B) of a motor starter 50m indicating an motor on condition.

The structure 100 can be designed to slidably receive multiple units 10, $50_1$, $50_2$ in various defined sizes. For example, the first and second units $50_1$, $50_2$ can each have housings 50h of the same or different modular heights (i.e., 1X-12X frame sizes as discussed above). Each housing 10h, 50h can include a front door 10f, 50f that can remain closed when a respective unit is energized. Only one of the two units $50_1$, $50_2$ can be energized when connected to the power bus bars 200 and connected to the load 80 via the bypass unit 10 at any one time. When in a de-energized state, the front door 50f of only that de-energized unit, one of the two units $50_1$, $50_2$, can be opened to allow a technician access to replace or repair that unit while the other of those two units $50_1$, $50_2$ is energized, connected to the power bus and load while the de-energized unit is electrically isolated from the energized unit and the bypass unit 10.

FIG. 3A illustrates that the bypass unit 10 can be placed in a first structure $100_1$ while the first unit $50_1$ and the second unit $50_2$ are in a separate, but typically adjacent, structure $100_2$. Each structure 100 can optionally have a front door 100f (shown by the shading over the respective units) that closes and releasably locks via at least one mechanical lock 114 in the closed position over one or more of the units $50_1$, $50_2$ and 10, respectively.

FIGS. 3B and 1 illustrate that the bypass unit 10 and the first and second units $50_1$, $50_2$ are held in the same structure 100. FIG. 3B illustrates that the units $50_1$, $50_2$ can be held in side by side, laterally adjacent compartments 110. FIG. 1 illustrates that the bypass unit and the first and second units $50_1$, $50_2$ can be held in a vertically stacked arrangement of compartment 110.

Referring to FIG. 1, each compartment 110 can have a closed floor 110f and/or ceiling and/or rails 112 coupled to internal sidewalls 110l that slidably receive and support the units 10, $50_1$, $50_2$.

Referring to FIGS. 4-6, the first and second units $50_1$, $50_2$ can have power stabs 554 extending rearward from the back 50r that connect to one or more (typically vertically oriented) power bus bars 200 that are part of a power bus system 1000 that carries power (current) to the compartments of a vertical section in the structure such as the MCC 100M. These power stabs 554 may optionally be provided by a power disconnect assembly 500 as discussed above. As is well known, the bus bars 200 can be connected to larger (typically horizontal bus bars) that bring power to the vertical sections. The larger (typically horizontal) bus bars are usually in the top, but some structures may have them in the center or bottom. The structures of MCCs 100M usually have at least one wire way 100w for conductors 30, 32, 34 (i.e., wires) to the load(s) and control wires.

FIG. 4 illustrates an MCC 100M with the bypass unit 10 and a first unit $50_1$ that can comprise a VFD $50_{VFD}$ as the motor starter 50m and can also comprise power stabs 554, shown as provided by a power disconnect assembly 500. FIG. 4 also illustrates that the second unit $50_2$ can comprise a NEMA starter $50_{Nm}$ as the motor starter 50m and can also comprise power stabs 554, shown as provided by a power disconnect assembly 500. The microswitches 582 and/or 594 (FIG. 10) can identify when the stabs 554 are fully engaged to the (vertical) power bus 200 and when the stabs 554 are fully withdrawn and isolated from the (vertical) bus 200.

FIG. 5 illustrates an MCC 100M with the bypass unit 10 and a first unit $50_1$ that can comprise a soft starter $50_{SS}$ as the motor starter 50m and can also comprise power stabs 554, shown as provided by a power disconnect assembly 500. FIG. 5 also illustrates that the second unit $50_2$ can comprise a NEMA starter $50_{Nm}$ as the motor starter 50m and can also comprise power stabs 554, shown as provided by a power disconnect assembly 500. The position sensors 582 and/or 594 (FIG. 10) can identify when the stabs 554 are fully engaged to the (vertical) power bus 200 and when the stabs 554 are fully withdrawn and isolated from the (vertical) power bus 200.

FIG. 6 illustrates an MCC 100M with the bypass unit 10 and a first unit $50_1$ that can comprise a VFD $50_{VFD}$ as the motor starter 50m and can also comprise power stabs 554, shown as provided by a power disconnect assembly 500. FIG. 6 illustrates that the second unit $50_2$ can comprise a soft starter $50_{SS}$ as the motor starter 50m and can also comprise power stabs 554, shown as provided by a power disconnect assembly 500. The position sensors (e.g., microswitches) 582 and/or 594 (FIG. 10) can identify when the stabs 554 are fully engaged to the (vertical) power bus 200 and when the stabs 554 are fully withdrawn and isolated from the (vertical) bus 200.

Thus, as shown by the examples of FIGS. 4-6, modular units $50_1$, $50_2$ of different motor starter configurations can allow a number of different MCC build selections and/or configurations without requiring unique more expensive custom units.

Referring to FIG. 7A, the power transfer switch 25 of the bypass unit 10 can comprise a first contactor $26_1$ that is mechanically interlocked with a mechanical interlock 125 to the second contactor $26_2$. A first set of three contacts 26c coupled to the first unit $50_1$ and a second set of three contacts 26c electrically coupled to the second unit $50_2$. The contactor can be a double throw contactor. The switch 25 can include a main switch body 25m and one or more auxiliary switches 27, typically at least one auxiliary switch 27 on each opposing end or side of the main switch body 25m. The auxiliary switches 27 can be configured to receive and/or transmit signals from and/or to the first unit $50_1$ and the second unit $50_2$.

Referring to FIG. 7B, a relay system 1510 in an MCC 100 can be coupled to one or more of the bypass unit 10, the first unit $50_1$, and/or the second unit $50_2$ can be used to identify when the first unit $50_1$ powers down, malfunctions or turns off, then automatically directly or indirectly sends a trip signal to direct or cause a shunt trip coil in the breaker 29 to trip the breaker 29 and automatically switch the power transfer switch 25 to electrically connect the second unit $50_2$. This automatic trip and transfer operation may be particularly suitable for critical loads. Tripping the circuit breaker 29 will electrically isolate the first unit $50_1$ as a standard contactor is not an isolation device.

One or more of the at least one auxiliary switch 27 can transmit a trip signal to the disconnect switch 60 of one of the first unit $50_1$ or the second unit $50_2$ when the other of the first unit $50_1$ or the second unit $50_2$ is energized with the stabs 554 contacting the power bus 200. A respective auxiliary switch 27 can be coupled to one or both units $50_1$, $50_2$ via a conductor 127 (e.g., wire(s)) (FIG. 7B). A trip signal can be transmitted to the circuit breaker 29 to automatically direct the circuit breaker 29 to trip to electrically isolate the first unit $50_1$ from the load and the second unit $50_2$ when the first unit $50_1$ fails or powers down.

One or more of the at least one auxiliary switch 27 can transmit the trip signal to the circuit breaker 29 in the bypass unit 10 when the first unit 50$_1$ fails or malfunctions, for example.

As also shown in FIG. 7B, the first and second units 50$_1$, 50$_2$ can be electrically coupled via one or more conductors 502 so that the first unit 50$_1$ can send a trip signal to the second unit 50$_2$ when the first unit 50$_1$ is connected to the power bus bars 200.

The second unit 50$_2$ can send a trip signal to the first unit 50$_1$ and the circuit breaker 29 when the second unit 50$_2$ is connected to the power bus bar 200. In some embodiments, the trip signal can be generated by an auxiliary switch in a respective unit 50$_1$, 50$_2$ such as a microswitch assembly associated with a position sensor 594 or 582 (FIG. 10) associated with one of the units with a power disconnect assembly 500 when the stabs of one of the units 50$_1$, 50$_2$ are fully extended and the stabs of the other unit are not extended (i.e., are retracted).

FIG. 7B illustrates that the structure 100, optionally an MCC 100M, can comprise the bypass unit 10 coupled to the first unit 50$_1$ and the second unit 50$_2$. Each unit 10, 50$_1$, 50$_2$, can be in separate housings 10h, 50h and placed in separate compartments of the structure 100. Each housing 10h, 50h can have a closed front panel or door 10f, 50f.

FIG. 8 illustrates an example MCC 100M with the first and second units 50$_1$, 50$_2$ and the bypass unit 10. The first and second units 50$_1$, 50$_2$ include operator handles 51 that are coupled to internal disconnect switches 60, such as circuit breakers, as is well known to those of skill in the art. The bypass unit 10 includes the switch handle 230 and a control switch 15 operable through a closed door. The (op-mech) switch handle 230 may be a rotary or up-down handle that is coupled to the power transfer circuit 20 (FIG. 1).

Still referring to FIG. 8, a typical MCC structure 100M is an enclosure with a number of small doors arranged in rows and columns along the front and flat, mostly featureless, back and sides. The units 10, 50 can be provided in varying sizes. For starter units 50$_1$, 50$_2$, the size can be based on the size of the load 80, e.g., motor 80m (FIG. 1) they are controlling. The units 10, 50$_1$, 50$_2$ can be configured to be relatively easily removable for repair, service or replacement. MCCs 100M can have different sets of units, for example, regular starters, reversing starters, soft start, and variable frequency drives. MCCs 100M can be configured so that sections can be added for expansion if needed.

MCCs 100M can be configured in many ways. Each compartment 110 can have a different height to accept different frame sizes of respective bucket assemblies or units 10, typically in about 6-inch increments. The vertical bus can be omitted or not run through the full height of the section to accommodate deeper buckets for larger items like variable frequency drives. The MCC can be a modular cabinet system for powering and controlling motors and/or feeder circuits. Several may be powered from main switchgear which, in turn, gets its power from a transformer attached to the incoming line from a public or private grid, e.g., a power company.

Referring to FIG. 8, a partial perspective view of a motor control center structure 100M is shown. Units 10, 53, 50$_1$, 50$_2$ are shown fully installed into a motor control center compartment 110 such that its respective front panel 10f, 53f, 50f is seated securely against the periphery of the compartment enclosure and flush with the front panel 54f of unit 54 and with the front panel 50f of units 50$_1$, 50$_2$.

In some embodiments, some or all units, e.g., units 53, 50$_1$, 50$_2$ can include a number of latching mechanisms 22 on front panels thereof so that an operator may lock a unit into place once installed. In some embodiments, the front panel 50f, 53f may be a deadfront door having a set of hinges 19 in order to permit access to motor control components within a unit while the unit is installed in a compartment 111 of the MCC 100M. However, even when closed or sealed, front panel or door 50f still permits access to the disconnect switch 60 which can comprise a circuit breaker, stab indicator 24, shutter indicator 26, and line contact actuator 31. Line contact actuator 31 is a mechanism of the power disconnect assembly 500 (FIG. 9) for selectively engaging a power bus 200 to engage power stabs 554 defining line contacts (FIG. 4) with line power from the MCC 100M. Thus, even when a unit 10, 50 is fully installed in a compartment 110 and latches 22 have been secured, an operator may still use respective disconnect switch handles 51, 230.

As shown in FIG. 8, the first unit 50$_1$ can have the handle 51 in an ON position associated with conduction and an energized state while the second unit 50$_2$ has the handle 51 in an OFF position associated with non-conduction and a de-energized state and the handle 51 can engage a lock 151 such as a padlock to lock the unit 50$_2$ in this state.

For units with the power disconnect assembly 500, a user can also open slide 132 to insert crank 134 to move one or more line contacts (not shown) of the unit. When slide 132 is moved laterally aside to permit access to actuating mechanism 131, door 50f is prevented from opening, thereby closing off access to components inside the unit 50$_1$, 50$_2$. Additionally, a user may desire to padlock 232 the slide 132 in the closed position (FIG. 14B), to further regulate who may operate actuating mechanism 131 and when.

When slide 132 is moved aside, an aperture 136 (FIG. 9) is exposed. Opening 36 accepts a crank 134. Additionally, when slide 132 is moved aside as shown, slide 132 may optionally extend over a portion of front panel 50f. Thus, in embodiments in which front panel 50f is a hinged door, moving slide 132 to expose aperture 136 will inhibit a user from opening front panel 50f. Accordingly, so long as an operator has a crank 134 inserted into aperture 136 aligned with the internal actuator 131, the operator cannot open the door of the unit 50$_1$, 50$_2$.

Figure 9:
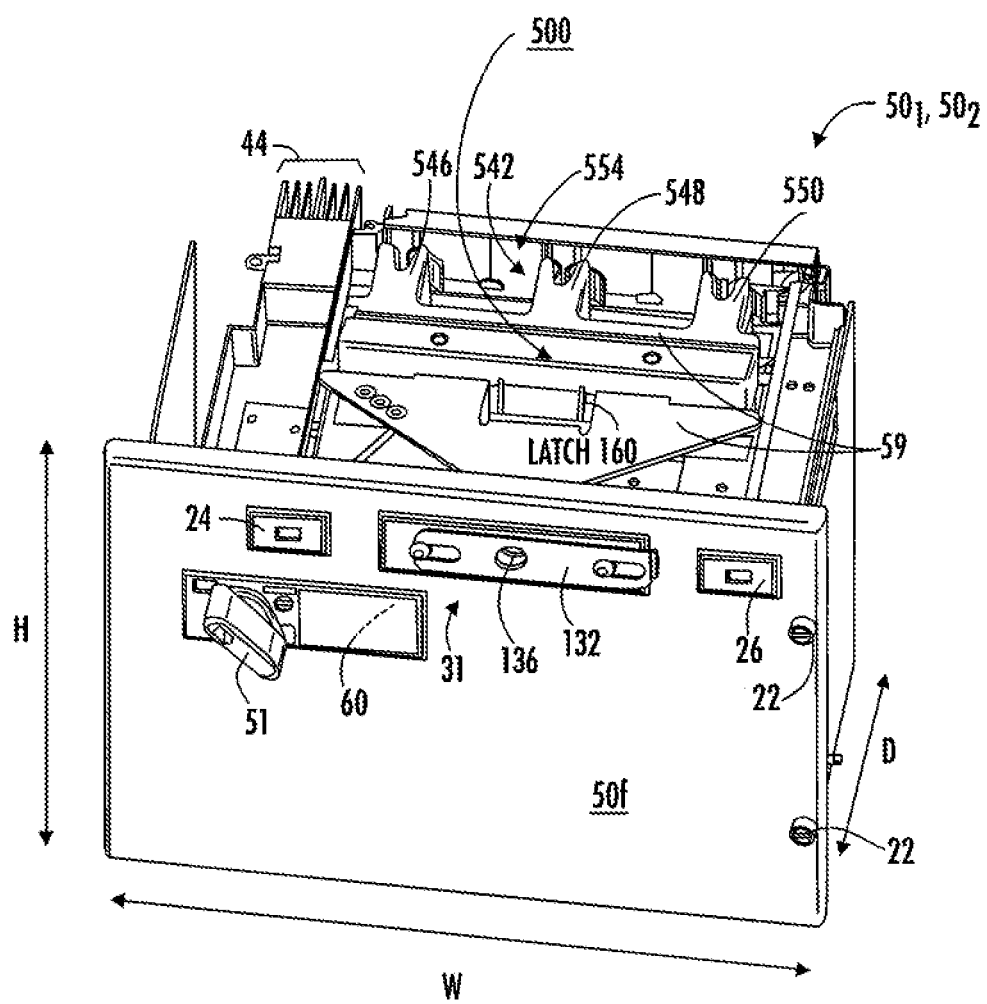
FIG. 9 is a top, side perspective view of an example unit with power stabs according to embodiments of the present invention.
Figure 10:
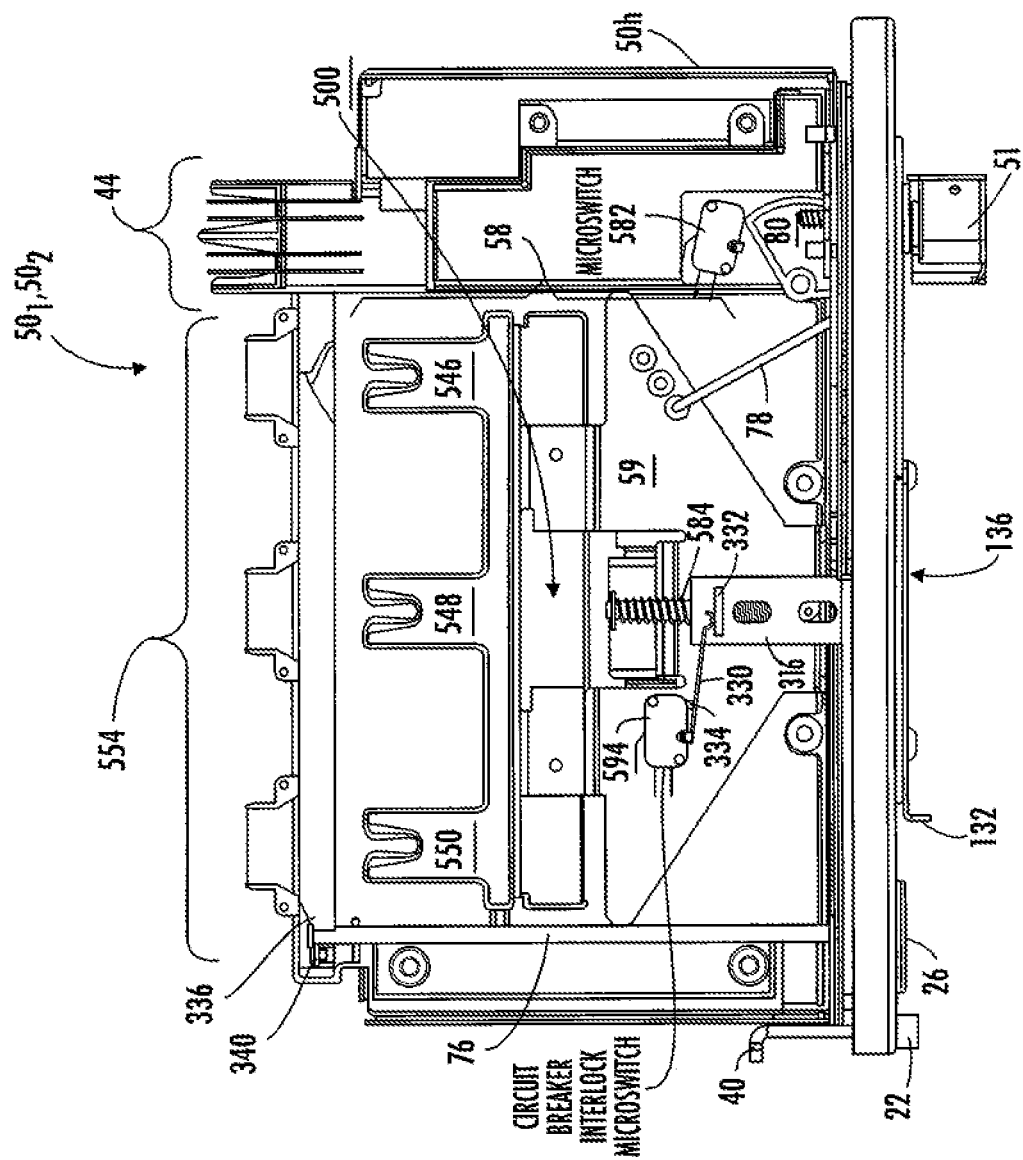
FIG. 10 is a bottom view of the example unit shown in FIG. 9 according to embodiments of the present invention.

FIGS. 9 and 10 show an example unit 50$_1$, 50$_2$ with an operator handle 51 coupled to the disconnect switch 60 and a power disconnect assembly 500 with retractable/extendable power stabs 554. During the extension of the power disconnect assembly 500 with the stabs 554 an automatic latch 60 can be triggered to engage the compartment 110 into which unit 50$_1$, 50$_2$ has been installed. Also due to the extension of the power disconnect assembly 500, a rod 78 is pulled by a stab bracket 59 such that a cam 80 is rotated away from a microswitch 582. Microswitch 582 is thus actuated to permit control voltage from a control power contact 44 to a motor control component, such as a contactor or overload relay (not shown). It is appreciated, however, that the position sensor assembly using the microswitch 582, cam 80 and rod 78 can be provided in other manners.

Also shown in FIG. 10 a second microswitch 594 can be connected to activate and deactivate a disconnect switch 60 such as a circuit breaker. When stabs 546, 548, 550 reach the fully engaged position with bus bars 200, stab bracket 59 actuates microswitch 594. When actuated, microswitch 594 permits closure of the disconnect switch 60, completing the circuit between bus bars 200 and the line side of motor control components (not shown) in unit 50$_1$, 50$_2$. Otherwise, microswitch 594 can prevent closure of its disconnect switch 60, e.g., circuit breaker. The microswitch 594 of the first unit 51 can send a trip signal to the disconnect switch 60 of the second unit $50_2$ when the microswitch 594 permits closure of its disconnect switch to trip the disconnect switch 60 in the second unit $50_2$ (and vice versa). This can be the signal transmitted via conductor lead 502 (FIGS. 3A, 3B, 3C, 7B).

Control power stab 44 can be un-shielded and connected to a control power once a respective unit $50_1$, $50_2$ is installed into a motor control center. However, microswitch 582 is in an activated state, due to the pressure thereon by cam 80. When microswitch 582 is in the activated state, as shown, microswitch 582 is interrupting control power from contact 44. Thus, the motor control components (not shown) housed in the unit housing 50h cannot initially be operated. Cam 80 will be moved by rod 78 via advancement of stab bracket 59, deactivating microswitch 582 and thereby permitting the flow of control power to motor control components (not shown) of the unit. Cam 80 also acts to display a location status of the stabs 546, 548, 550 to an operator. Cam 80 can have a number of colors thereon which can be displayed through front door 50f of the unit via stab indicator 24 (FIG. 8).

In the embodiment shown in FIG. 10, a disconnect switch (e.g., circuit breaker) interlock 316 includes microswitch 594, which gates the operation of the disconnect switch 60. FIG. 10 shows microswitch 594 in a deactivated state, in which button 334 thereof is not depressed. Arm 330 of microswitch 594 is positioned to abut a ledge 332 of interlock 316. Thus, when disconnect switch interlock 316 moves, due to the motion of stab assembly 58, the arm 330 of microswitch 594 will pivot, depressing button 334. When button 334 is depressed, microswitch 594 will be activated and will electrically allow operation of the disconnect switch (FIGS. 4-6).

FIG. 9 also has height "H", width "W" and depth "D" dimensions which may be provided in modular frame sizes of 1X-12X as discussed above with respect to the bypass unit 10. In some embodiments, the bypass unit 10 has a height that is less than the height of the units $50_1$, $50_2$. The bypass unit 10 and the units $50_1$, $50_2$ can have common depth and width dimensions. In other embodiments, the units $50_1$, $50_2$ can have common depth and width dimensions and the bypass unit 10 can have a different depth and/or width dimension.

Also shown in FIG. 10 is a shutter arm 336, having a sloped end 338. As stab 546 is advanced, stab 546 will engage the sloped end 338 and slide past shutter arm 336, thereby shifting shutter arm 336 to the left, as depicted in FIG. 10. When shutter arm 336 is shifted, it will strike a tab 340 of a rod 76 extending in a front to back direction of the unit. When tab 340 is struck, rod 76 will rotate, changing the color showing on shutter indicator 26 through door 50f of a respective unit $50_1$, $50_2$.

The electrical distribution devices contemplated by embodiments of the invention can include electrical and mechanical interlocks. FIG. 11 lists example actions of the first (primary) unit $50_1$, the second (redundant) unit $50_2$, and the bypass unit 10 providing an electrical interlocking system based on defined conditions or states of the first and second units $50_1$, $50_2$.

FIG. 12 lists example mechanical locks that can be used to provide a mechanical interlocking system for an electrical distribution device 100 with the first (primary) unit $50_1$, the second (redundant) unit $50_2$, and the bypass unit 10. That is, when units $50_1$, $50_2$ comprising a power disconnect assembly 500 is used (FIGS. 4-6, 9, 10), when one unit is energized, the other unit can be padlocked via padlock 132 (FIG. 14B) to lock the unit that is not being used to power the load to lock the power disconnect assembly 500 with its stabs in a retracted state with the slide 32 (FIGS. 8, 9) misaligned from portal 36.

At the same time the bypass unit 10 can be padlocked or otherwise locked into a primary mode associated with powering the load through the first unit $50_1$ or the bypass mode associated with powering the load through the second unit $50_2$.

Figure 13A:
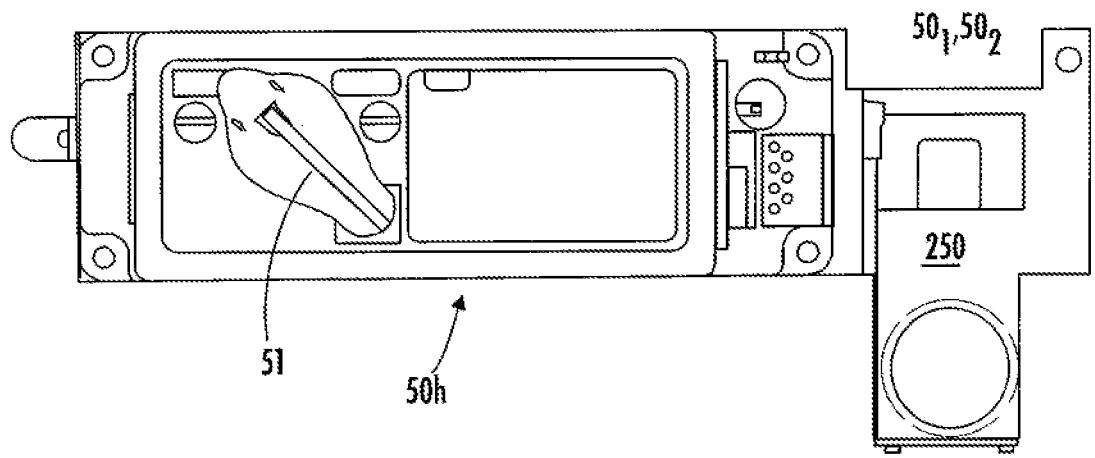
FIG. 13A is a partial front view of a front panel segment of an example unit with a keyed interlock according to embodiments of the present invention.
Figure 13B:
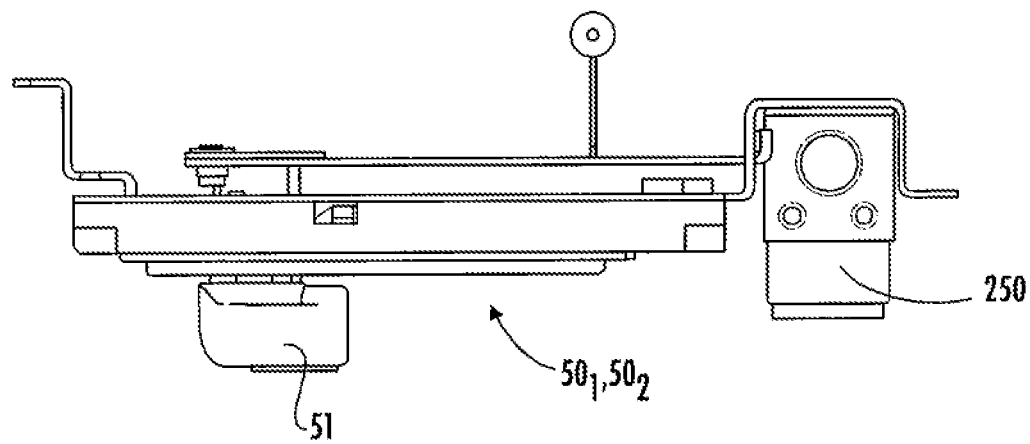
FIG. 13B is a top view of the device shown in FIG. 13A.
Figure 14A:
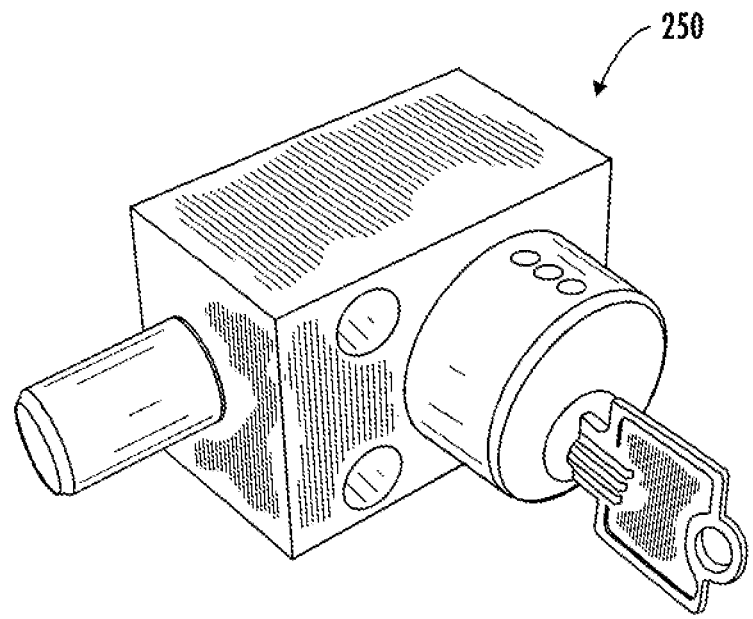
FIG. 14A is an enlarged view of the keyed interlock shown in FIG. 13A.
Figure 14B:
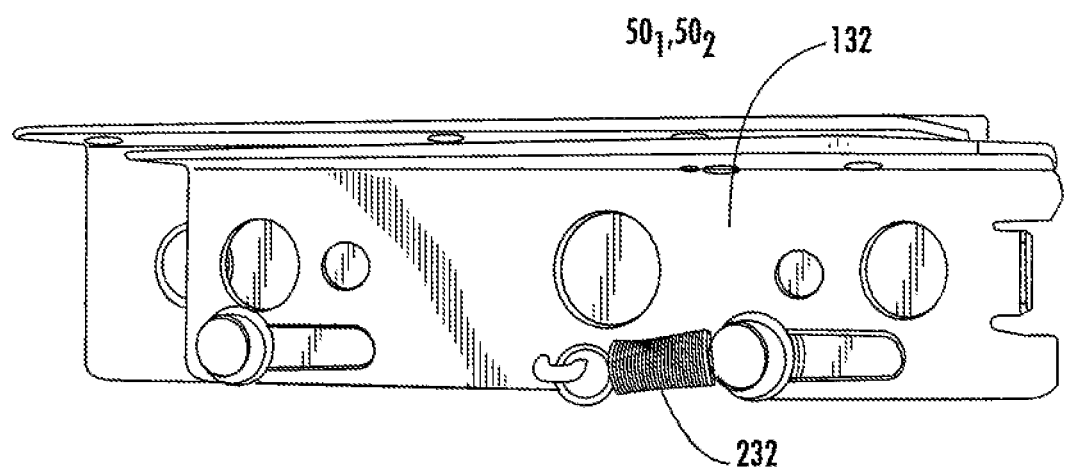
FIG. 14B is an enlarged view of a mechanically locked slide of a unit of the MCC shown in FIG. 8.

A third interlock may be used where a trapped-key interlock device 250 of a unit $50_1$, $50_2$ that allows a disconnect switch 51 (e.g., breaker) to be operated only when the key is turned to allow the handle 51 to be turned to the ON position (FIGS. 13A, 13B, 14A). As is known to those of skill in the art, a trapped-key interlock typically has a lock cylinder which operates a sliding bolt through a cam. The sliding bolt, when extended, mechanically prevents operation of a switch, valve, gate, or other device. Many variations exist, with different shapes of interlock bolt and multiple lock cylinders on an interlock. The key is held or trapped in one position of the lock; releasing the key indicates that the interlocked device has been made safe; the interlocked device cannot be re-energized until the key has been returned and operated to retract the bolt. An example of a trapped-key interlock device 250 is a Kirk® key safety interlock from Kirk Key Interlock Company, North Canton, Ohio.

A first standard unit $50_1$ with a first motor starter (e.g., a VFD, Soft starter, NEMA starter, IEC starter or the like) can be referred to as unit "A" and a second standard unit $50_2$ as a redundant unit with a motor starter of the same or different type (e.g., a VFD, Soft starter, NEMA starter or IEC starter of the like) can be referred to as unit "B" and can be placed in an adjacent location next to unit A. A third (compact) unit "C" provided as the bypass unit 10 comprises the power transfer circuit 20 with a transfer switch 25 which controls the connection to the load 80, and which switches motor control from the unit "A" to unit "B". Both unit A and unit B can comprise power disconnect assemblies 500 allowing for (FlashGard™ isolator features providing arc flash safety, e.g., a stab racking mechanism with bus isolation and stab position indicators) power bus isolated unit configurations. The disconnect switches 60 in the two units can be configured as main circuit breakers that can be mechanically interlocked with a mechanical lock such as a Kirk® Key interlock and can also be electrically interlocked with shunts trip accessories controlled by position sensors such as microswitches and auxiliary switches and/or relays in those units $50_1$, $50_2$ associated with, for example, FlashGard™ isolators and interlocks. As each unit $50_1$, $50_2$ has a separate unit door 50f, each of these units can be electrically isolated and completely disconnected from the power bus 200, i.e., a 480V/600V system, providing a safe working environment.

The unit 10, $50_1$, $50_2$ can be configured for DC (direct current) and/or AC (alternating current) operation.

In some embodiments, the circuit breaker 29 and/or the disconnect switch 60 of the units $50_1$, $50_2$ can comprise a molded case circuit breaker. Molded case circuit breakers are well known to those of skill in the art, as exemplified by U.S. Pat. Nos. 4,503,408 and 5,910,760, the contents of which are incorporated herein by reference as if recited in full herein. In other embodiments, the disconnect switch 60 can comprise a fused disconnect switch to turn power on and off.

Exemplary fuses are FUSETRON™ 600V Class RK5 fuses (BU-SB13729) available from Cooper Bussmann Company, St. Louis, Mo. However, the design is flexible and can accommodate other fuses including those in different classes.

Figure 15:
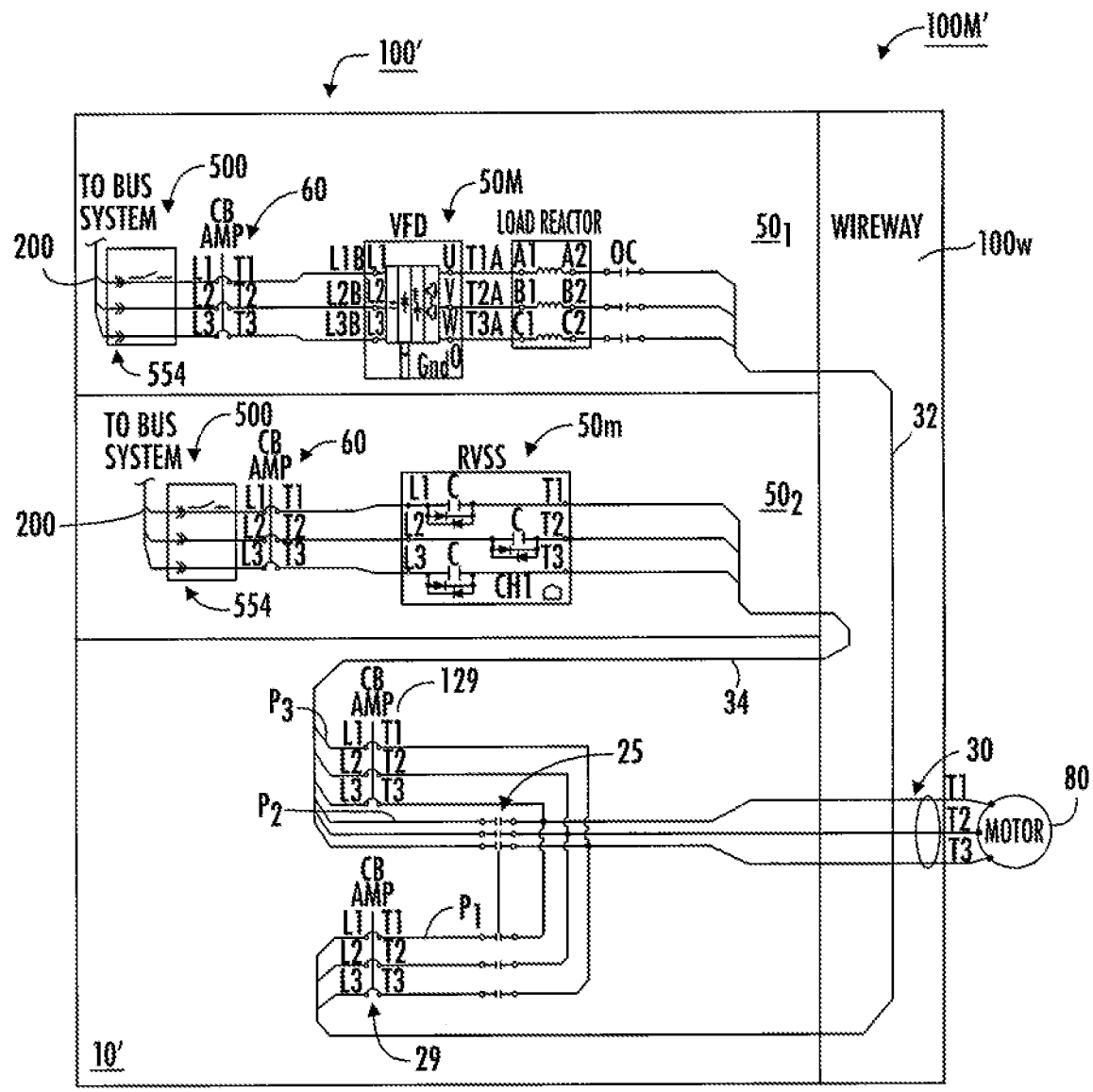
FIG. 15 is a schematic illustration of an electrical distribution system with a power transfer switch having first and second contactors in combination with a manually engageable back-up bypass path according to embodiments of the present invention.

FIG. 15 illustrates that the electrical distribution system 100', such as, for example, an MCC 100M', can be configured with a bypass unit 10' comprising a manual back-up bypass configuration that provides an additional bypass path $P_3$ that can be engaged if the auto bypass switch 25 with the first and second contactors $26_1$, $26_2$ is not operating properly. The electrical distribution system 100' as discussed herein can include any or all of the features described herein (i.e., the auxiliary inputs, interlocks and control circuits). The manual bypass path $P_3$ can be provided as an override system that once mechanically engaged by a user operated switch 130 (FIG. 16), typically with an operator handle 231 (FIG. 17) can lock out the automatic bypass switch 25 and provide the power to the load 80 from the second unit $50_2$, through path $P_3$ to the load 80. The manually engageable alternate or back-up bypass electrical path $P_3$ includes a circuit breaker 129 that is normally open so that the alternate back-up bypass electrical path $P_3$ is isolated until the manual handle 231 (FIG. 17) closes the contacts of the circuit breaker 129 and electrically and/or mechanically locks out the power transfer switch 25 and primary path $P_1$ and bypass path $P_2$. The first unit $50_1$ will be electrically isolated when the second unit $50_2$ is powering the load 80 as discussed above.

The second and third paths $P_2$, $P_3$, can merge to the conductor 34 inside the bypass unit 10' and be configured to connect with the second unit $50_2$ along a common conductor length/segment.

Figure 16:
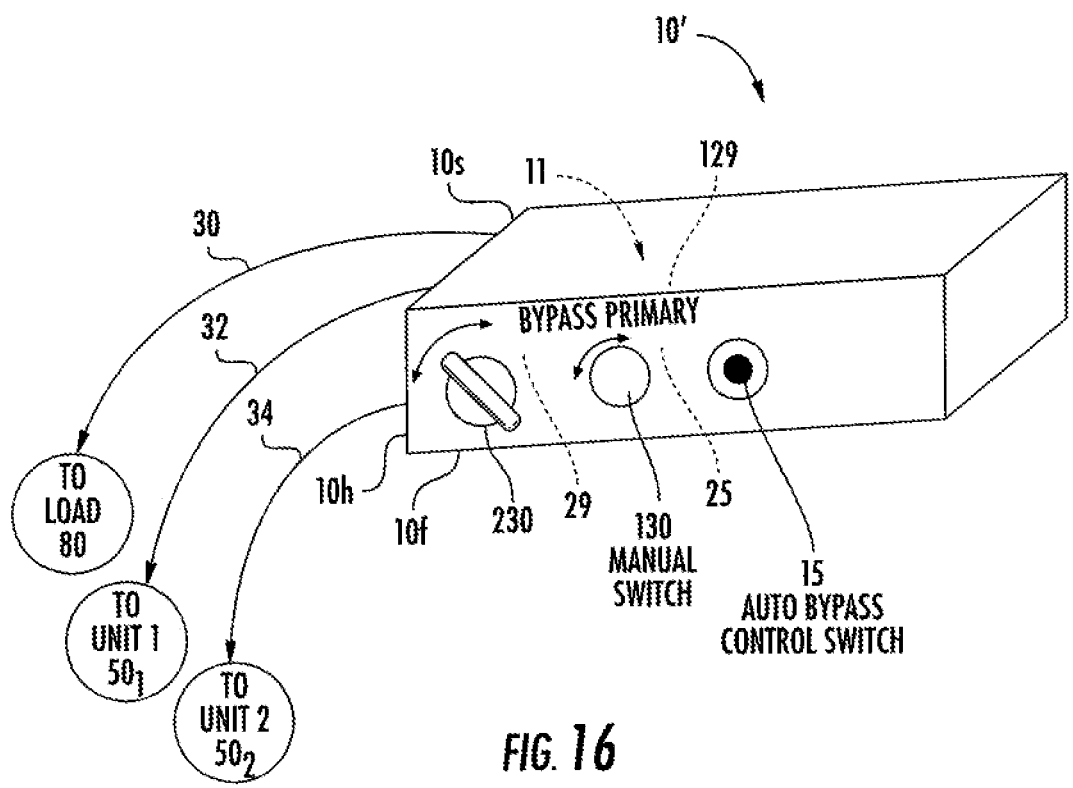
FIG. 16 is a front perspective view of another embodiment of a bypass unit suitable for the electrical distribution system shown in FIG. 15 according to embodiments of the present invention.

FIG. 16, which is similar to FIG. 2A, illustrates the bypass unit 10' can have a front panel 10f with the operator handle 230, the automatic bypass control switch 15 and the manual back-up bypass switch 130.

The operator handle 230 and manual switch 130 with an operator handle 231 can be configured as rotary or up-down operating handles. The electronic control switch 15 can be a push-button or a rotary button, in some embodiments. However, the electronic control switch 15 can have other configurations.

Figure 17:
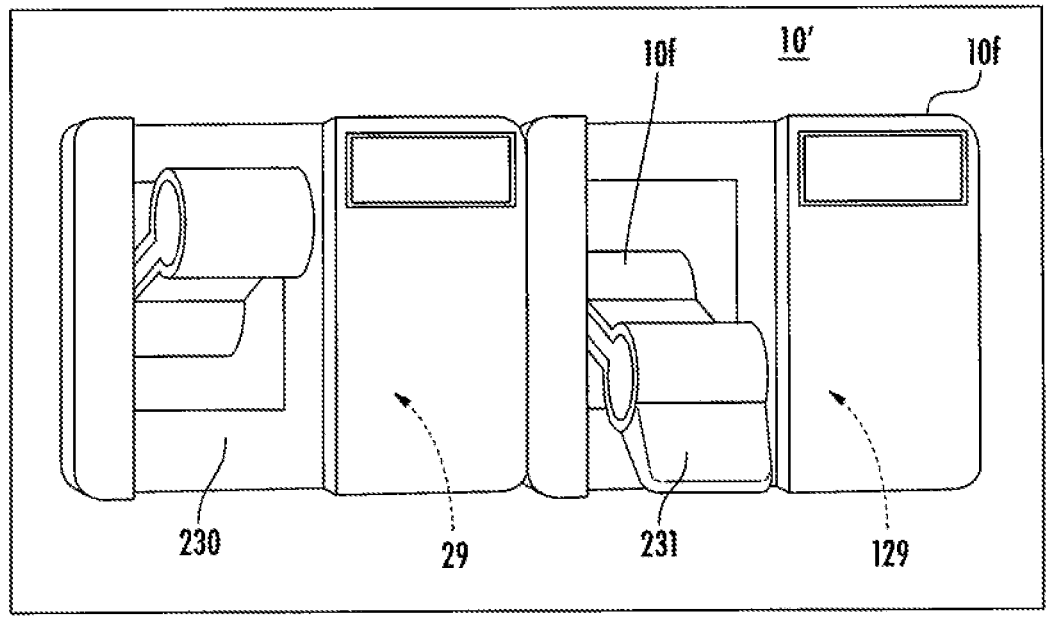
FIG. 17 is a partial front view of a bypass unit suitable for the electrical distribution system shown in FIG. 15 according to embodiments of the present invention.

FIG. 17 illustrates an example of the bypass unit 10' with the automatic bypass switch 25 and manual bypass switch 130 shown as comprising an operator mechanism handle 231 coupled to the circuit breaker 129 which is adjacent the operator handle 230 coupled to the circuit breaker 29 of the bypass path $P_1$ coupled to the first contactor $26_1$ of the power transfer circuit 25 and the first unit $50_1$ (FIG. 15).

Figure 18:
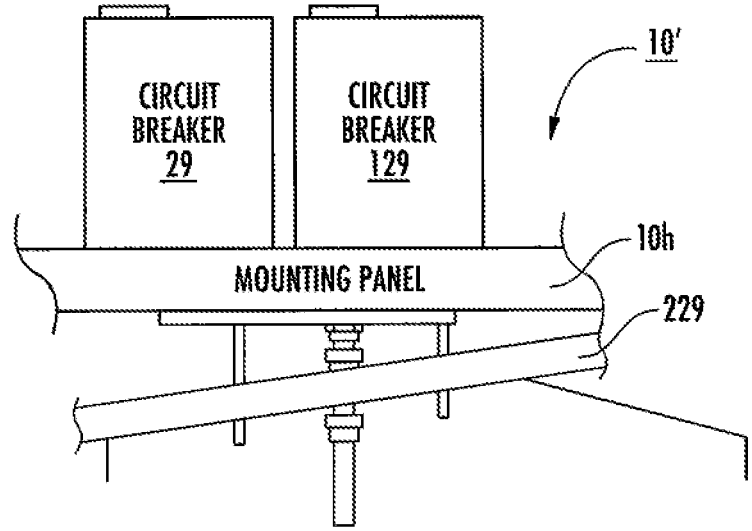
FIG. 18 is a top schematic view of a bypass unit with a mechanical interlock suitable for the electrical distribution system shown in FIG. 15 according to embodiments of the present invention.

FIG. 18 illustrates that the bypass unit 10' can comprise a walking beam 229 coupled to the first and second breakers 29, 129 which defines an interlock that allows only one of the first breaker 29 in the primary path $P_1$ or the second breaker 129 of the bypass path $P_3$ to close at any one time. Other mechanical and/or electrical interlocks may be used.

Figure 19A:
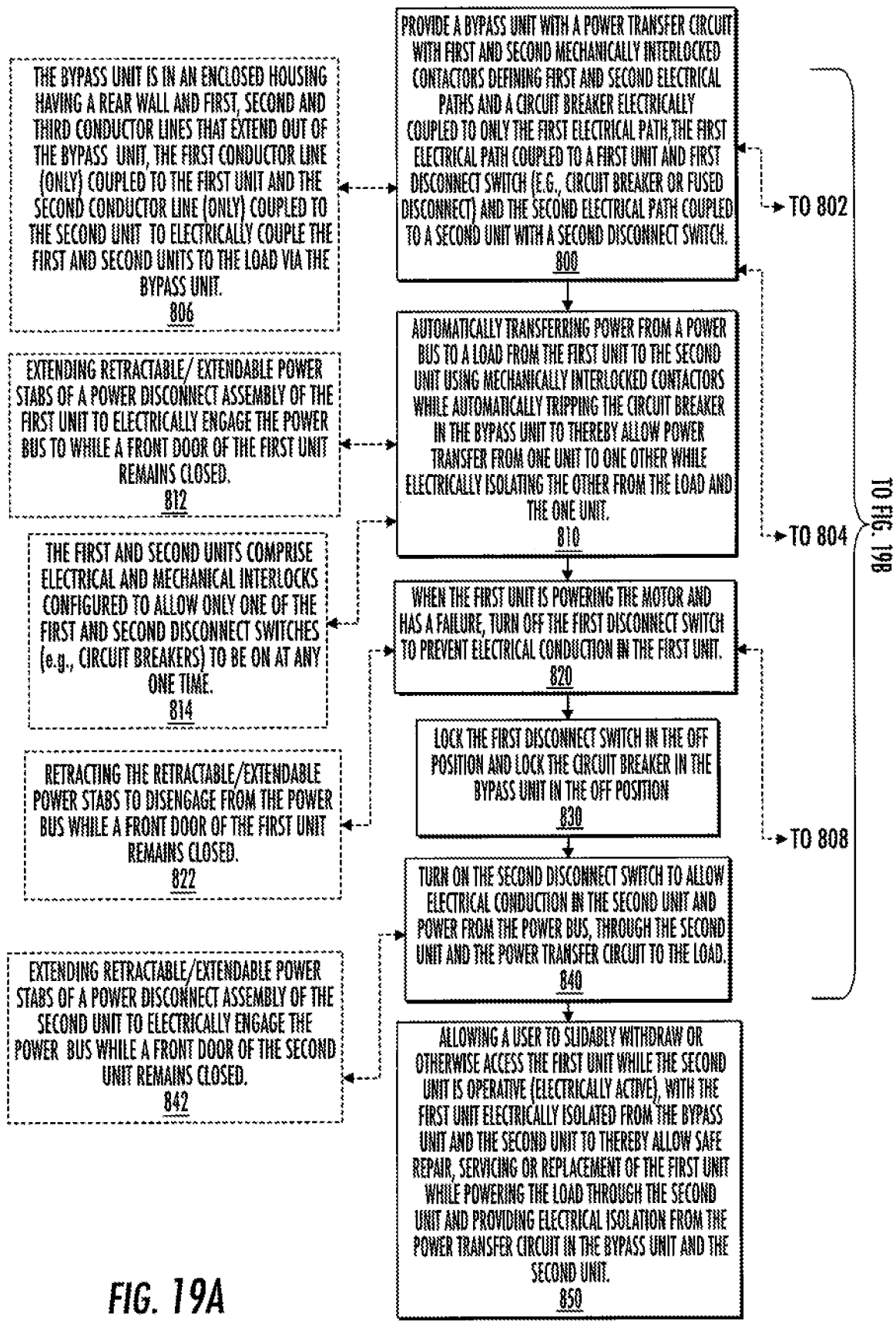
FIG. 19A/19B is a flow chart of actions that can be carried out to power a load according to embodiments of the present invention.
Figure 19B:
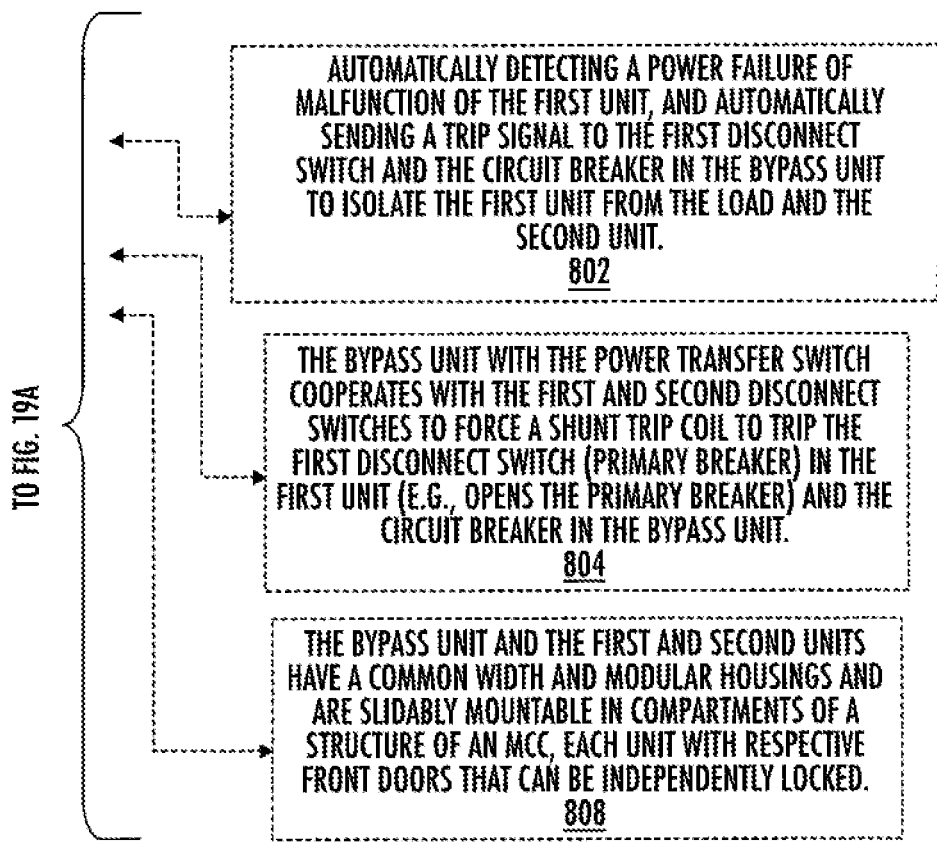

FIGS. 19A/19B illustrate example actions that can be carried out according to embodiments of the present invention. A bypass unit with a power transfer circuit is the power transfer circuit is provided. The power transfer switch comprises mechanically interlocked first and second contactors configured to electrically couple to a load and define first and second electrical paths where only one of the first and second contactors close at any one time. The bypass unit further comprises a circuit breaker in the bypass unit coupled to a load side of the power transfer switch and also coupled to the first electrical path to thereby inhibit feedback to an isolated unit. The circuit breaker has an externally accessible operator handle that faces a front of the bypass unit and is configured to allow a user to lock the handle in an off position associated with non-conduction in the first electrical path (block 800).

Automatically transferring power from a power bus to a load from the first unit to the second unit using mechanically interlocked contactors while automatically tripping the circuit breaker in the bypass unit to thereby allow power transfer from one unit to one other while electrically isolating the other from the load and the one unit (block 810).

When the first unit is powering the motor and has a failure, the first disconnect switch is turned off to prevent electrical conduction in the first unit and a trip signal is sent to the circuit breaker in the bypass unit to automatically isolate the first unit (block 820).

The first disconnect switch is locked in the off position and the circuit breaker in the bypass unit can also be locked in the off position (block 830).

The second disconnect switch is turned on to allow electrical conduction in the second unit. Power from the power bus, through the second unit and the power transfer circuit is provided to the load (block 840).

A user is allowed to slidably withdraw or otherwise access the first unit while the second unit is operative (electrically active), with the first unit electrically isolated from the bypass unit and the second unit to thereby allow safe repair, servicing or replacement of the first unit while powering the load through the second unit and providing electrical isolation from the power transfer circuit in the bypass unit and the second unit (block 850)

The method can include automatically detecting a power failure or malfunction of the first unit, and automatically sending a trip signal to the first disconnect switch and the circuit breaker in the bypass unit to isolate the first unit from the load and the second unit (block 802).

The bypass unit with the power transfer switch cooperates with the first and second disconnect switches to force a shunt trip coil to trip the first disconnect switch (primary breaker) in the first unit (e.g., opens the primary breaker) and trip the circuit breaker in the bypass unit itself (block 804).

The bypass unit and the first and second units have a common width and modular housings and are slidably mountable in compartments of a structure of an MCC, each unit with respective front doors that can be independently locked (block 808).

The bypass unit is in an enclosed housing having a rear wall and first, second and third conductors that extend out of the bypass unit, the first conductor (only) coupled to the first unit and the second conductor (only) coupled to the second unit to electrically couple the first and second units to the load via the bypass unit (block 806).

Extending retractable/extendable power stabs of a power disconnect assembly of the first unit to electrically engage the power bus while a front door of the first unit remains closed (block 812).

The first and second units comprise electrical and mechanical interlocks configured to allow only one of the first and second disconnect switches (e.g., circuit breakers) to be ON at any one time (block 814).

Retracting the retractable/extendable power stabs to disengage from the power bus while a front door of the first unit remains closed (block 822).

The bypass unit can have an external user switch input that accepts user input to close one of the first set or the second set of switch contacts of one of the contactors. When transferring power from the first unit to the second unit, the first set of switch contacts are opened and the second set of switch contacts are closed (block 824).

Extending retractable/extendable power stabs of a power disconnect assembly of the second unit to electrically engage the power bus while a front door of the second unit remains closed (block 842).

Figure 20:
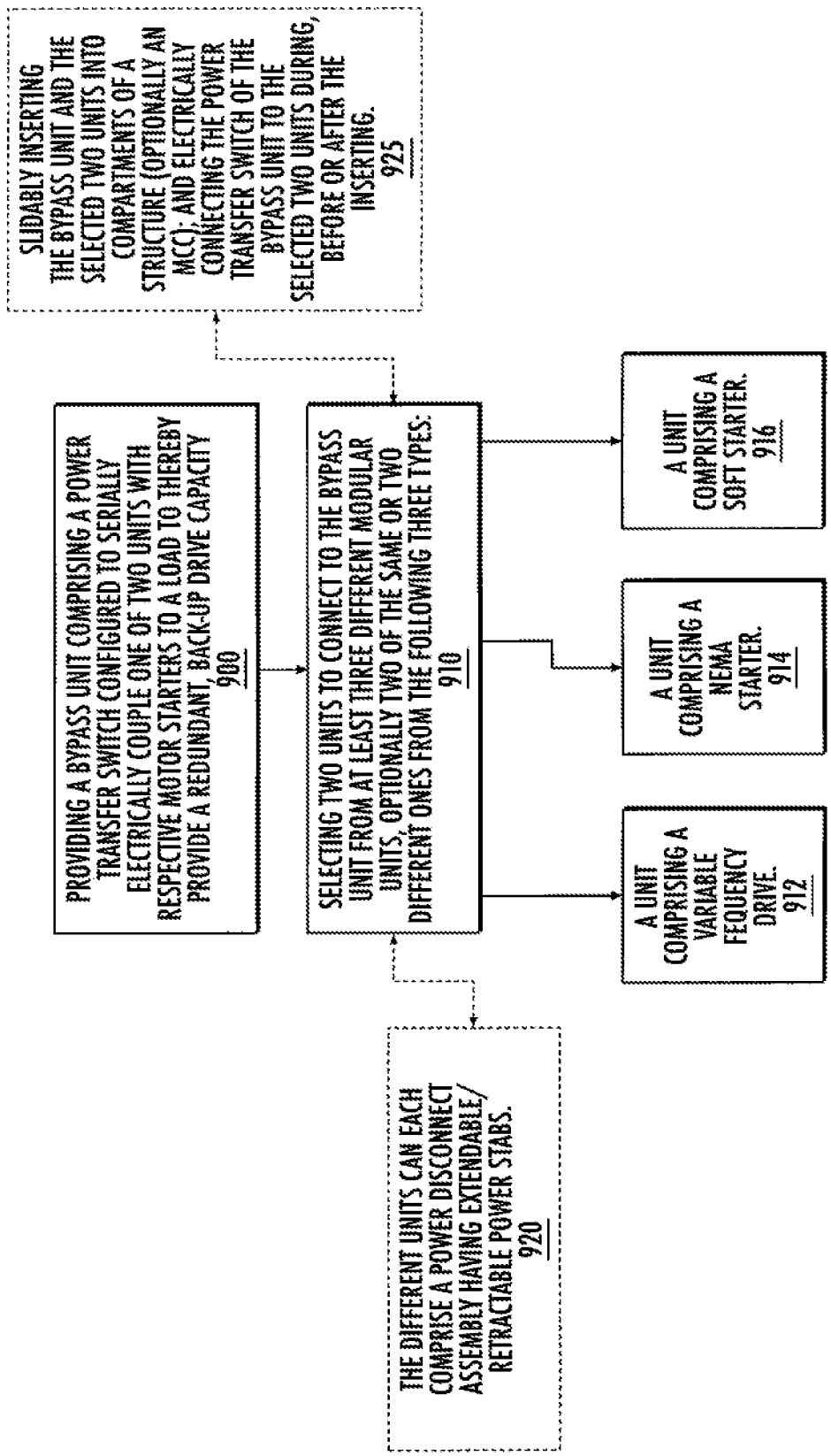
FIG. 20 is a flow chart of an example build process allowing for end user builds from a defined set of modular unit options according to embodiments of the present invention.

FIG. 20 is a flow chart of example actions of a modular build assembly allowing for standardized builds from defined sets of different units avoiding unique single build customization according to embodiments of the present invention.

A bypass unit is provided. The bypass unit comprising a power transfer switch with mechanically interlocked first and second contactors configured to electrically couple to a load and define first and second electrical paths where only one of the first and second contactors close at any one time, wherein the bypass unit further comprises a circuit breaker in the bypass unit coupled to a load side of the power transfer switch and also coupled to the first electrical path to thereby inhibit feedback to an isolated unit, wherein the circuit breaker has an externally accessible operator handle that faces a front of the bypass unit and is configured to allow a user to lock the handle in an off position associated with non-conduction in the first electrical path (block 900). Two units are selected to connect to the bypass unit from at least three different modular units, optionally two of the same or two different ones from the following at least three types (block 910).

A first unit comprising a variable frequency drive (block 912). A second unit comprising a NEMA starter (block 914), and a third unit comprising a soft starter (block 916).

The first, second and third units can each comprise a power disconnect assembly having extendable/retractable power stabs (block 920).

The bypass unit and the selected two units can be slidably inserted into compartments of a structure, such as a structure of an MCC and the power transfer switch of the bypass unit is electrically coupled to the selected two units during, before or after the inserting (block 925).

It is contemplated that both "new" builds and field retrofit structures of electrical distribution devices 100 such as MCCs 100M can benefit from the new bypass unit 10 and primary and secondary units 50₁, 50₂ discussed above.

Figure 21:
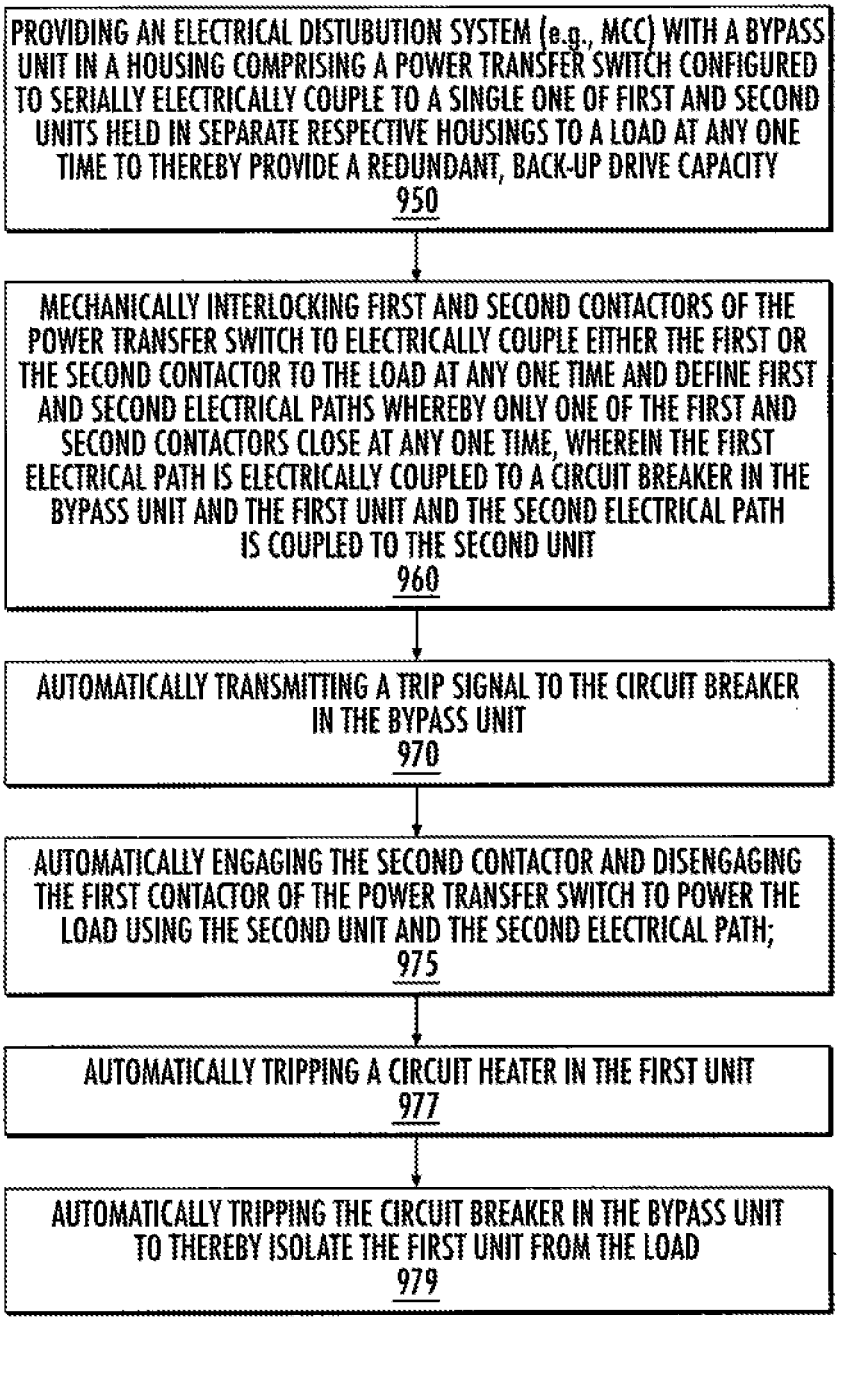
FIG. 21 is a flow chart of example actions that can be used to power a load according to embodiments of the present invention.

FIG. 21 is a flow chart of actions that can be used to automatically transfer power to a load according embodiments of the present invention.

An electrical distribution system such as an MCC is provided. The MCC has a bypass unit in a housing comprising a power transfer switch configured to serially electrically couple to a single one of first and second units held in separate respective housings to a load at any one time to thereby provide a redundant, back-up drive capacity (block 950).

First and second contactors of the power transfer switch are mechanically interlocked to electrically couple either the first or the second contactor to the load at any one time and define first and second electrical paths whereby only one of the first and second contactors close at any one time, wherein the first electrical path is electrically coupled to a circuit breaker in the bypass unit and the first unit and the second electrical path is coupled to the second unit (block 960).

A power failure or malfunction of the first unit is electronically detected (typically using a relay system) (block 970).

If a malfunction of power failure is detected, then automatically transmitting a trip signal to the circuit breaker in the bypass unit, automatically engaging the second contactor and disengaging the first contactor of the power transfer switch to power the load using the second unit and the second electrical path; automatically tripping a disconnect switch in the first unit; and automatically tripping the circuit breaker in the bypass unit to thereby isolate the first unit from the load (blocks 975-979).

Optionally, the bypass unit can include a back-up bypass path with a circuit breaker and the methods can include allowing a user to manually engage the back-up bypass path while concurrently interlocking a circuit breaker of the first primary path from being in an operative position (block 981).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention. Therefore, it is to be understood that the foregoing is illustrative of the present invention and is not to be construed as limited to the specific embodiments disclosed, and that modifications to the disclosed embodiments, as well as other embodiments, are intended to be included within the scope of the invention.

That which is claimed is:

1. An electrical power distribution system comprising:
   a power bus;
   a bypass unit comprising a power transfer switch coupled to a load;
   a first unit comprising a first disconnect switch configured to couple the power bus to the power transfer switch; and
   a second unit comprising a second disconnect switch configured to couple the power bus to the power transfer switch,
   wherein the power transfer switch comprises mechanically interlocked first and second contactors configured to selectively couple only one of the first and second units to the load at any one time,
   wherein the bypass unit includes a circuit breaker configured to couple the first unit to the first contactor, wherein the circuit breaker has an operator mechanism configured to be moved between ON and OFF positions to close and open the circuit breaker, respectively, and configured to allow a user to lock the operator mechanism in the ON or OFF position,
   wherein, when the first disconnect switch is closed and the power transfer switch couples the first unit to the load, the second disconnect switch is open to electrically isolate the second unit from the load and the first unit, and
   wherein, when the first disconnect switch is closed and the power transfer switch couples the second unit to the load, the first disconnect switch is open to electrically isolate the first unit from the load and the second unit,
   wherein, at any one point in time during normal operation, the power transfer switch of the bypass unit is configured to electrically connect the power bus to the load using only one of the first unit or the second unit,
   wherein, when the power transfer switch couples the first unit to the load, the first disconnect switch is closed while the second disconnect switch is open to electrically isolate the second unit from the load and the first unit, and wherein, when the power transfer switch couples the second unit to the load, the second disconnect switch is closed while the first disconnect switch is open to electrically isolate the first unit electrically from the load and the second unit.

2. The electrical power distribution system of claim 1, wherein the first and second units each further comprise a housing and a power disconnect assembly with extendable/retractable power stabs that independently move relative to the housing to connect to and disconnect from the power bus, and wherein the extendable/retractable power stabs of only one of the first unit or the second unit is permitted to be connected to the power bus at any one time.

3. The electrical power distribution system of claim 1, wherein the bypass unit comprises a housing with a front wall, side walls and a rear wall and is devoid of power stabs and does not directly connect to the power bus.

4. The electrical power distribution system of claim 1, wherein each of the bypass unit, the first unit and the second unit includes a separate housing that is independently insertable and removable from a respective compartment in at least one structure of the electrical distribution system.

5. The electrical power distribution system of claim 1, wherein the first unit further comprises a first motor starter and the second unit further comprises a second motor starter, and wherein the electrical power distribution system further comprises at least one structure with defined spaced-apart internal compartments that hold the bypass unit, the first unit and the second unit in different ones of the defined spaced-apart internal compartments, wherein the first unit comprises a first front door with a first disconnect operator handle operably coupled to the first disconnect switch, wherein the second unit comprises a second front door with a second disconnect operator handle operably coupled to the second disconnect switch, and wherein the electrical power distribution system further comprises interlocks that (a) prevent the first door from opening when either the first disconnect switch is closed or the first unit is coupled to the load and (b) prevent the second door from opening when either the second disconnect switch is closed or the second unit is coupled to the load.

6. The electrical power distribution system of claim 1, wherein the bypass unit and the first and second units are configured to be insertable and removable from spaced-apart compartments of a structure defining internal compartments, wherein the second electrical path in the bypass unit is devoid of a circuit breaker, and wherein the bypass unit further comprises a manually activatable back-up bypass path as a third path in the bypass unit comprising a circuit breaker that connects the load to the second unit without requiring the second path from the second contactor, optionally wherein the third path and the second path merge in the bypass unit to a common conductor output from the bypass unit, wherein the common conductor output is configured to couple to the second unit.

7. The electrical power distribution system of claim 1, wherein the first and second disconnect switches are circuit breakers, and wherein at least one of the bypass unit or the first and second units are electrically coupled to cause a first one of either the first disconnect switch or the second disconnect switch to trip to an open state when a second one of the first disconnect switch or the second disconnect switch is closed to allow conduction whereby only a single one of the first or second disconnect switch is closed at any one time.

8. The electrical power distribution system of claim 1, wherein the electrical distribution device is a motor control center (MCC).

9. The electrical power distribution system of claim 1, wherein the first disconnect switch and the second disconnect switch each comprise a circuit breaker, and wherein the power transfer switch comprises auxiliary switches that are configured to automatically transmit a trip signal to the first unit prior to or concurrently with engaging the second contactor.

10. The electrical power distribution system of claim 1, further comprising a relay system associated with the first unit, wherein the relay system is configured to detect a malfunction or power off event of the first unit and responsively (i) trip open the circuit breaker and open the first contactor to decouple the first unit from the load and (ii) close the second contactor to couple the second unit to the load and automatically transfer power from the power bus to the second unit and the second electrical path and to the load and (ii) automatically directly or indirectly via an auxiliary switch transmit a control signal to the circuit breaker in the bypass unit to cause the circuit breaker to trip.

11. The electrical power distribution system of claim 1, wherein the first unit and the second unit are provided as one of options A-L:

| Option | first unit | second unit |
| --- | --- | --- |
| A | VFD unit | VFD unit |
| B | Soft Starter (Reduced Voltage starter) unit | Soft Starter (Reduced Voltage starter) unit |
| C | NEMA Starter unit | NEMA Starter unit |
| D | IEC Starter unit | IEC Starter unit |
| E | VFD unit | Soft Starter (Reduced Voltage starter) unit |
| F | Soft Starter (Reduced Voltage starter) unit | NEMA Starter unit |
| G | NEMA Starter unit | IEC Starter unit |
| H | VFD unit | NEMA Starter unit |
| I | Soft Starter (Reduced Voltage starter) unit | IEC Starter unit |
| J | VFD unit | IEC Starter unit |
| K | Feeder Breaker | Feeder Breaker |
| L | Feeder Fused | Feeder Fused. |

12. The electrical power distribution system of claim 1, wherein the bypass unit further comprises a first conductor coupled to switch contacts of the first contactor, a second conductor coupled to switch contacts of the second contactor, and a third conductor configured to couple to the load and the first and second contactors, the first conductor extending from the bypass unit a distance sufficient to couple to the first unit, the second conductor extending from the bypass unit a distance sufficient to couple to the second unit, and the third conductor extending from the bypass unit and having a length sufficient to couple to the load.

13. The electrical power distribution system of claim 12, wherein the first and second conductors extend from the bypass unit through a wire way to connect to the respective first and second units.

14. The electrical power distribution system of claim 1, wherein the electrical power distribution device is a motor control center (MCC), wherein the first and second units each further comprise a housing and a power disconnect assembly with extendable/retractable power stabs that independently move relative to the housing to connect to and disconnect from the power bus, wherein the extendable/retractable power stabs of only one of the first and second units are permitted to be connected to the power bus at any one time, and wherein the first unit and the second unit each comprise a lock that, when deployed, physically (a) locks the power disconnect assembly in at least one defined position associated with one or both (i) a retracted position associated with an electrically isolated state of the respective unit or (ii) an extended position associated with engagement with the power bus and an electrically active state, and/or (b) locks a laterally movable slide from allowing access to an aperture that allows a crank to change a position of the power stabs.

15. The electrical power distribution system of claim 14, further comprising at least one interlock that is configured to allow a user to open and/or remove the first unit from the MCC only when the first unit is in the electrically isolated state and the circuit breaker in the bypass unit is open while allowing the second unit to be energized, connected to the power bus to provide power to the load through the second contactor of the bypass unit.

16. The electrical power distribution system of claim 1, wherein each of the first and second units is independently insertable and removable from a respective compartment of a structure of the electrical distribution system and each is serially interchangeable with a different corresponding unit having a common size and shape housing thereby allowing modular repair and replacement, and wherein the bypass unit is held in a housing with a closed front door and has a height that is in a range of about 6-12 inches.

17. The electrical power distribution system of claim 1, wherein the bypass unit, the first unit and the second unit are held in separate housings, wherein the bypass unit, the first unit and the second unit are configured to power a load with horsepower in a range of about ¼ horsepower to 200 horsepower, and wherein the bypass unit has a closed front door with a front operating switch handle coupled to the power transfer switch.

18. The electrical power distribution system of claim 1, wherein the power transfer switch of the bypass unit further comprises at least one auxiliary switch, and wherein the at least one auxiliary switch is configured to transmit and/or receive control signals to/from at least one of the first or second units.

19. The electrical power distribution system of claim 1, wherein the first disconnect switch includes a first circuit breaker and the second disconnect switch includes a second circuit breaker, and wherein the first and second circuit breakers and the power transfer switch are electrically interlocked, such that, when the power transfer switch couples one of the first and second units to the load, only the associated first or second circuit breaker can be closed.

20. The electrical power distribution system of claim 19, wherein the power transfer switch further comprises at least one auxiliary switch coupled to the circuit breakers that is configured to transmit a trip signal to the circuit breaker of the first disconnect switch when the power transfer switch couples the second unit to the load.

21. A method of assembling an electrical distribution system, comprising;
providing a bypass unit in a housing comprising a power transfer switch configured to couple to only one of first and second separate units held in separate respective housings to a load at any one time, wherein the power transfer switch comprises mechanically interlocked first and second contactors configured to selectively couple the first and second units to the load where only one of the first and second contactors close at any one time, wherein the bypass unit further comprises a circuit breaker coupled between the first unit and the first contactor to thereby inhibit electrical feedback to the first unit when the second contactor is closed and the second unit is energized, wherein the circuit breaker has an operator handle configured to be moved between ON and OFF positions to close and open the circuit breaker, respectively, and configured to allow a user to lock the operator mechanism in the ON or OFF position; and
selecting only two units as the first and second units to connect to the bypass unit from one of options A-L:

| Option | first unit | second unit |
|---|---|---|
| A | VFD unit | VFD unit |
| B | Soft Starter (Reduced Voltage starter) unit | Soft Starter (Reduced Voltage starter) unit |
| C | NEMA Starter unit | NEMA Starter unit |
| D | IEC Starter unit | IEC Starter unit |
| E | VFD unit | Soft Starter (Reduced Voltage starter) unit |
| F | Soft Starter (Reduced Voltage starter) unit | NEMA Starter unit |
| G | NEMA Starter unit | IEC Starter unit |
| H | VFD unit | NEMA Starter unit |
| I | Soft Starter (Reduced Voltage starter) unit | IEC Starter unit |
| J | VFD unit | IEC Starter unit |
| K | Feeder Breaker | Feeder Breaker |
| L | Feeder Fused | Feeder Fused. |

22. The method of claim 21, wherein the first and second units each comprise a power disconnect assembly having extendable/retractable power stabs.

23. The method of claim 21, further comprising:
slidably inserting the bypass unit and the selected first and second units into compartments of a structure of the electrical distribution system; and
electrically connecting the power transfer switch of the bypass unit to the selected first and second units during, before or after the inserting.

24. The method of claim 23, wherein the electrical distribution system is a Motor Control Center.

25. The method of claim 21, wherein the selected first and second units and the bypass unit each have a dedicated, respective front door, and wherein the bypass unit has a closed rear panel with a plurality of conductors extending outward therefrom including an conductor that couples to a load, and conductors that couple to the selected first and second units.

26. The method of claim 21, wherein the power transfer switch of the bypass unit comprises at least one auxiliary switch attached thereto, and wherein the at least one auxiliary switch is configured to transmit and/or receive control signals to/from at least one of the first or second units.

27. The method of claim 21, wherein a first set of three switch contacts of the first contactor are coupled only to the first unit while a second set of three switch contacts of the second contactor, different from the first set of three switch contacts, are coupled only to the second unit to thereby serially couple the load to the first unit and the second unit via the bypass unit, and optionally wherein the bypass unit further comprises a manually activatable back-up bypass path with a circuit breaker that connects the load to the second unit.

28. A bypass unit for an electrical power distribution system having a structure defining a plurality of separate compartments including first, second and third compartments, the first compartment having a first unit installable therein and the second compartment having a second unit installable therein, the bypass unit comprising:
a housing configured to be insertable and removable from the third compartment;
a bypass circuit with a power transfer switch in the housing, wherein the power transfer switch comprises mechanically interlocked first and second contactors configured to selectively couple to a load and define first and second electrical paths where only one of the first and second contactors close at any one time, wherein the bypass unit further comprises a circuit breaker in the bypass unit coupled to the first electrical path, wherein the circuit breaker has an externally accessible operator handle that faces a front of the bypass unit and is configured to allow a user to lock the handle in an off position associated with an open state of the circuit breaker and non-conduction in the first electrical path;
a first conductor coupled to a first set of three switch contacts of the first contactor and extending out of the housing;
a second conductor coupled to a second set of three switch contacts of the second contactor and extending out of the housing; and
a third conductor coupled to a load side of the power transfer switch and extending out of the housing with a length sufficient to couple to a load;
wherein the first conductor is configured to electrically couple to the first unit and the second conductor is configured to electrically couple to the second unit.

29. The bypass unit of claim 28, wherein the housing has a height in a range of about 6-12 inches.

30. The bypass unit of claim 28, wherein the power transfer switch is configured to power the load from a power bus using the second unit only when a disconnect switch of the first unit and the circuit breaker of the bypass unit are closed and in an off state associated with non-conduction to thereby provide electrical isolation of the first unit allowing a user to access or remove the first unit from the structure while the second unit is powering the load through the bypass unit.

31. The bypass unit of claim 28, wherein the housing is rectangular and configured to be insertable and removable from the third compartment.

32. The bypass unit of claim 28, further comprising at least one auxiliary switch in the bypass unit coupled to the power transfer switch, wherein the at least one auxiliary switch is configured to transmit and/or receive control signals to/from at least one of the first or second units.

33. The bypass unit of claim 28, further comprising a manually activatable back-up bypass path with a circuit breaker that is configured to connect the load to the second unit as a back-up to the second contactor, wherein the circuit breaker of the back-up bypass path comprises an operator handle, and wherein only one of the circuit breaker of the back-up bypass path and the circuit breaker coupled to the first contactor is closed at any one time.

34. A method of transferring power from one unit to another unit to power a load using a motor control center (MCC), comprising:
providing an MCC with a power bus, a first unit having a first housing, a second unit having a second housing and a bypass unit having a bypass unit housing, the bypass unit housing comprising a power transfer switch configured to couple a load to a single one of the first and second units at any one time to thereby provide a redundant power source for the load;
mechanically interlocking first and second contactors of the power transfer switch to selectively couple only one of the first and second contactors to the load at any one time
providing in the bypass unit a circuit breaker coupled between the first unit and the first contactor;
electronically detecting a power failure or malfunction of the first unit;
automatically opening the circuit breaker in the bypass unit;
automatically opening a disconnect switch in the first unit; and
automatically opening the first contactor of the power transfer switch and closing the second contactor to power the load using the second unit.

35. The method of claim 34, further comprises allowing a user to manually engage a back-up bypass path comprising a circuit breaker that connects the load to the second unit, wherein the disconnect switch in the first unit is interlocked in an open position in response to the manual engagement.

* * * * *